(12) United States Patent
Suzuki et al.

(10) Patent No.: US 12,045,056 B2
(45) Date of Patent: Jul. 23, 2024

(54) INFORMATION PROCESSING APPARATUS, INFORMATION PROCESSING METHOD, AND MEDIUM

(71) Applicant: CANON KABUSHIKI KAISHA, Tokyo (JP)

(72) Inventors: Masahiro Suzuki, Kawasaki (JP);
Makoto Tomioka, Kawasaki (JP);
Toshihiro Kobayashi, Tokyo (JP);
Akihiro Katayama, Tokyo (JP);
Masakazu Fujiki, Kawasaki (JP);
Kazuhiko Kobayashi, Yokohama (JP);
Daisuke Kotake, Yokohama (JP);
Shuichi Mikame, Tokyo (JP);
Tomoyuki Ueno, Beijing (CN);
Chiyako Nakajima, Yokohama (JP);
Satomi Nagashima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 972 days.

(21) Appl. No.: 16/922,821

(22) Filed: Jul. 7, 2020

(65) Prior Publication Data
US 2020/0333789 A1 Oct. 22, 2020

Related U.S. Application Data

(63) Continuation of application No. PCT/JP2018/047030, filed on Dec. 20, 2018.

(30) Foreign Application Priority Data

Jan. 12, 2018 (JP) ................. 2018-003818

(51) Int. Cl.
*G01S 17/89* (2020.01)
*G01S 17/931* (2020.01)
*G05D 1/00* (2006.01)

(52) U.S. Cl.
CPC ............ *G05D 1/0212* (2013.01); *G01S 17/89* (2013.01); *G01S 17/931* (2020.01)

(58) Field of Classification Search
CPC ...... G01S 17/89; G01S 17/894; G01S 17/931; G05D 1/0212; G05D 1/0234; G05D 2201/0216
See application file for complete search history.

(56) References Cited

U.S. PATENT DOCUMENTS 8,416,314 B2 * 4/2013 Li ................. H04N 17/002 348/222.1
9,826,213 B1 * 11/2017 Russell ................. B65G 69/00
(Continued)

FOREIGN PATENT DOCUMENTS

| CN | 1855224 A | 11/2006 |
|---|---|---|
| CN | 101078632 A | 11/2007 |

(Continued)

OTHER PUBLICATIONS

Tateno, K., et al., "CNN-SLAM: Real-time monocular SLAM with learned depth prediction", IEEE Computer Society Conference CVPR, 2017, pp. 6243-6252.

*Primary Examiner* — Jaime Figueroa
*Assistant Examiner* — Zachary Joseph Wallace
(74) *Attorney, Agent, or Firm* — Canon U.S.A., Inc., IP Division

(57) ABSTRACT

There is provided with an information processing apparatus. An acquisition unit acquires a first processing result including information for identifying the position of the mobile object and a second processing result including information for identifying the position of the mobile object. The first processing result is obtained by executing a first processing method on an image obtained by measuring at least surroundings of the mobile object by using a light receiving sensor installed on the mobile object. The second processing (Continued)

result is obtained by executing a second processing method different from the first processing method on an observation result obtained by observing the mobile object by using a light receiving sensor installed at a location at which it is possible to observe the mobile object.

19 Claims, 17 Drawing Sheets

(56) References Cited

U.S. PATENT DOCUMENTS

| | | | |
|---|---|---|---|
| 10,928,245 B2* | 2/2021 | Onasch | B64C 39/024 |
| 10,970,544 B2* | 4/2021 | Adachi | B65G 1/04 |
| 11,046,562 B2* | 6/2021 | High | G06Q 10/30 |
| 11,222,299 B1* | 1/2022 | Baalke | G06Q 10/087 |
| 2010/0315512 A1 | 12/2010 | Li | |
| 2012/0033071 A1 | 2/2012 | Kobayashi | |
| 2015/0032295 A1* | 1/2015 | Stark | B64C 19/00 |
| | | | 701/3 |
| 2016/0253806 A1 | 9/2016 | Iimura | |
| 2017/0097232 A1* | 4/2017 | Anderson-Sprecher | B25J 5/007 |
| 2017/0252925 A1* | 9/2017 | Cho | B25J 9/1666 |
| 2017/0352275 A1* | 12/2017 | Maruyama | G06T 7/70 |
| 2018/0079085 A1* | 3/2018 | Nakata | G05D 1/024 |
| 2018/0306587 A1* | 10/2018 | Holz | B66F 17/003 |
| 2019/0033867 A1* | 1/2019 | Sharma | G01C 21/26 |
| 2019/0050000 A1* | 2/2019 | Kennedy | G05D 1/106 |
| 2020/0109949 A1* | 4/2020 | Vaganay | G01C 21/20 |
| 2020/0264616 A1* | 8/2020 | Suzuki | G01S 17/89 |
| 2020/0333790 A1* | 10/2020 | Kobayashi | G06T 7/277 |
| 2020/0380699 A1* | 12/2020 | Amo | G05D 1/02 |
| 2020/0402256 A1* | 12/2020 | Kobayashi | G05D 1/0251 |
| 2021/0053232 A1* | 2/2021 | Watanabe | B25J 19/023 |

FOREIGN PATENT DOCUMENTS

| | | |
|---|---|---|
| CN | 101334837 A | 12/2008 |
| CN | 101438335 A | 5/2009 |
| CN | 103252778 A | 8/2013 |
| CN | 103308051 A | 9/2013 |
| CN | 104200494 A | 12/2014 |
| CN | 104616502 A | 5/2015 |
| CN | 105637321 A | 6/2016 |
| CN | 105973228 A | 9/2016 |
| CN | 106092090 A | 11/2016 |
| CN | 107339986 A | 11/2017 |
| JP | 2003-241836 A | 8/2003 |
| JP | 2003241836 A | 8/2003 |
| JP | 2003-300186 A | 10/2003 |
| JP | 2003300186 A | 10/2003 |
| JP | 2012-037391 A | 2/2012 |
| JP | 2013-045298 A | 3/2013 |
| JP | 2015-206798 A | 11/2015 |
| JP | 2015206798 A | 11/2015 |
| JP | 2016-152003 A | 8/2016 |
| JP | 2016-162013 A | 9/2016 |
| WO | 2011013862 A1 | 2/2011 |

* cited by examiner

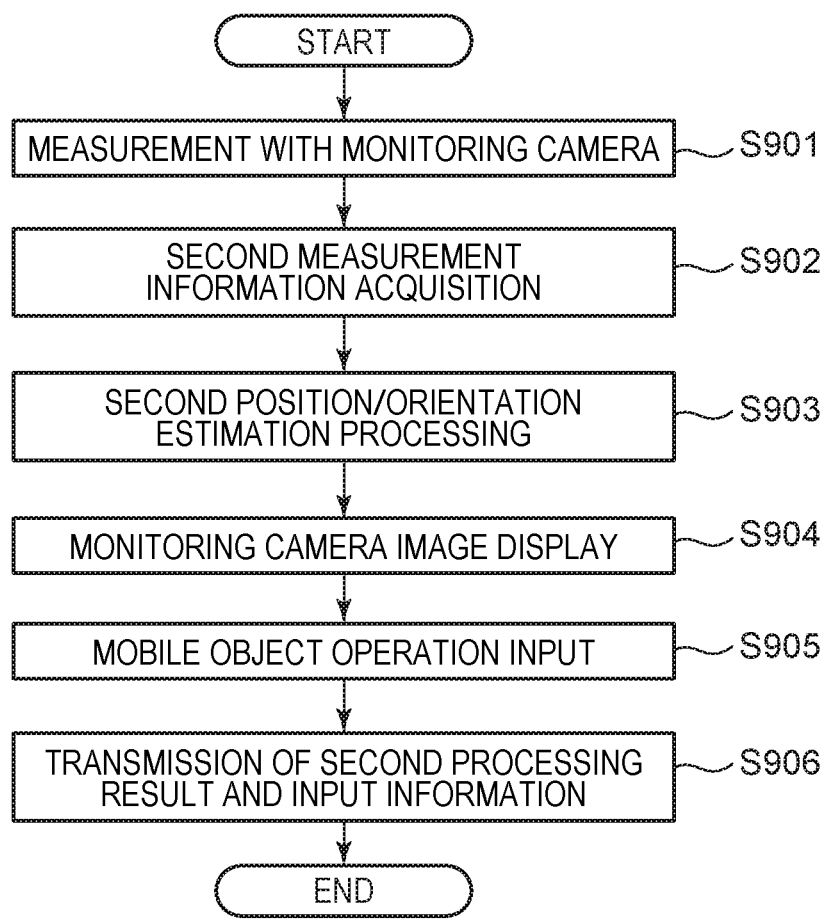

INFORMATION PROCESSING APPARATUS, INFORMATION PROCESSING METHOD, AND MEDIUM

CROSS-REFERENCE TO RELATED APPLICATIONS

This application is a Continuation of International Patent Application No. PCT/JP2018/047030, filed June Dec. 20, 2018, which claims the benefit of Japanese Patent Application No. 2018-003818, filed Jan. 12, 2018, both of which are hereby incorporated by reference herein in their entirety.

BACKGROUND OF THE INVENTION

Field of the Invention

The present invention relates to a technique of acquiring a position of a mobile object.

Description of the Related Art

A technique has been proposed in which a mobile object such as a transport vehicle (for example, an AGV (Automated Guided Vehicle)) is autonomously driven in an environment such as a factory or a warehouse. The autonomous driving refers to a technology that allows it to autonomously move to a destination without needing a person to drive. Japanese Patent Laid-Open No. 2013-45298 proposes a method in which a mobile object is provided with a sensor for measuring the distance of the surrounding objects from the mobile object, and the mobile object estimates the position of the mobile object itself using the sensor's measurement value.

SUMMARY OF THE INVENTION

According to an embodiment of the present invention, an information processing apparatus configured to determine a position of a mobile object comprises: an acquisition unit configured to acquire a first processing result including information for identifying the position of the mobile object and a second processing result including information for identifying the position of the mobile object, the first processing result being obtained by executing a first processing method on an image obtained by measuring at least surroundings of the mobile object by using a light receiving sensor installed on the mobile object, the second processing result being obtained by executing a second processing method different from the first processing method on an observation result obtained by observing the mobile object by using a light receiving sensor installed at a location at which it is possible to observe the mobile object; and determination unit configured to determine the position of the mobile object based on the first processing result and the second processing result.

According to another embodiment of the present invention, a non-transitory computer-readable medium stores a program which, when executed by a computer comprising a processor and a memory, causes the computer to perform an information processing method of determining a position of a mobile object, comprising: acquiring a first processing result capable of identifying the position of the mobile object and a second processing result capable of identifying the position of the mobile object, the first processing result being obtained by executing a first processing method on an image obtained by measuring at least surroundings of the mobile object by using a light receiving sensor installed on the mobile object, the second processing result being obtained by executing a second processing method different from the first processing method on an observation result obtained by observing the mobile object by using a light receiving sensor installed at a location at which it is possible to observe the mobile object; and determining the position of the mobile object based on the first processing result and the second processing result.

According to still another embodiment of the present invention, an information processing method of determining a position of a mobile object comprises: acquiring a first processing result capable of identifying the position of the mobile object and a second processing result capable of identifying the position of the mobile object, the first processing result being obtained by executing a first processing method on an image obtained by measuring at least surroundings of the mobile object by using a light receiving sensor installed on the mobile object, the second processing result being obtained by executing a second processing method different from the first processing method on an observation result obtained by observing the mobile object by using a light receiving sensor installed at a location at which it is possible to observe the mobile object; and determining the position of the mobile object based on the first processing result and the second processing result.

Further features of the present invention will become apparent from the following description of exemplary embodiments with reference to the attached drawings.

BRIEF DESCRIPTION OF THE DRAWINGS

Accompanying drawings are included in and form part of the description, illustrate embodiments of the invention, and together with the description, serve to explain the principles of the present invention.

FIG. 17 is a flowchart illustrating a processing procedure performed by a monitoring camera management system.

DESCRIPTION OF THE EMBODIMENTS

Embodiments are described below with reference to drawings. Note that configurations shown in the following embodiments are merely examples, and the present invention is not limited to these configurations illustrated below.

The estimation method disclosed in Japanese Patent Laid-Open No. 2013-45298 has a drawback that as the moving distance of the mobile object increases, the accuracy of the estimation decreases, and thus it is difficult to achieve high-reliability estimation of the position of the mobile object.

An embodiment of the present invention enables to acquire a position of a mobile object in a highly reliable manner.

Embodiment 1

In Embodiment 1 described below, the present invention is applied to controlling of movement of a mobile object, in this case an autonomous transport vehicle (for example, an AGV (Automated Guided Vehicle)). This mobile object is capable of estimating its position by itself and autonomously controlling its movement to a specified destination.

In the present embodiment, first measurement information provided by a depth sensor and an image capturing apparatus installed on the mobile object is input together with map-related information into a first estimation method. As a result, a first processing result is acquired. Furthermore, an image captured by a monitoring camera is input to a second estimation method. As a result, a second processing result is acquired. Position/orientation information on the mobile object 11 is then determined, and the mobile object 11 moves autonomously. The position/orientation information includes information about the position and the orientation of the mobile object in world coordinates. The monitoring camera is installed on a ceiling or a wall in an environment such as a factory, a warehouse, or the like, to capture an image of the mobile object or its marker. The monitoring camera is capable of capturing a wide field of view in the environment, and thus it is possible to acquire an image of a scene in an area that cannot be measured by the image capturing apparatus or the depth sensor installed on the mobile object. The capability of capturing the mobile object from a plurality of images makes it possible to acquire the position of the mobile object in a more reliable manner than acquired by performing the estimation from an image captured by one image capturing apparatus. The monitoring camera and the mobile object separately estimate the position of the mobile object by their own different processing methods, and the results are integrated. Thus, it is possible to determine the position of the mobile object in a more reliable manner than in the case where the estimation is made by one method.

(Description of Configuration)

Figure 1:
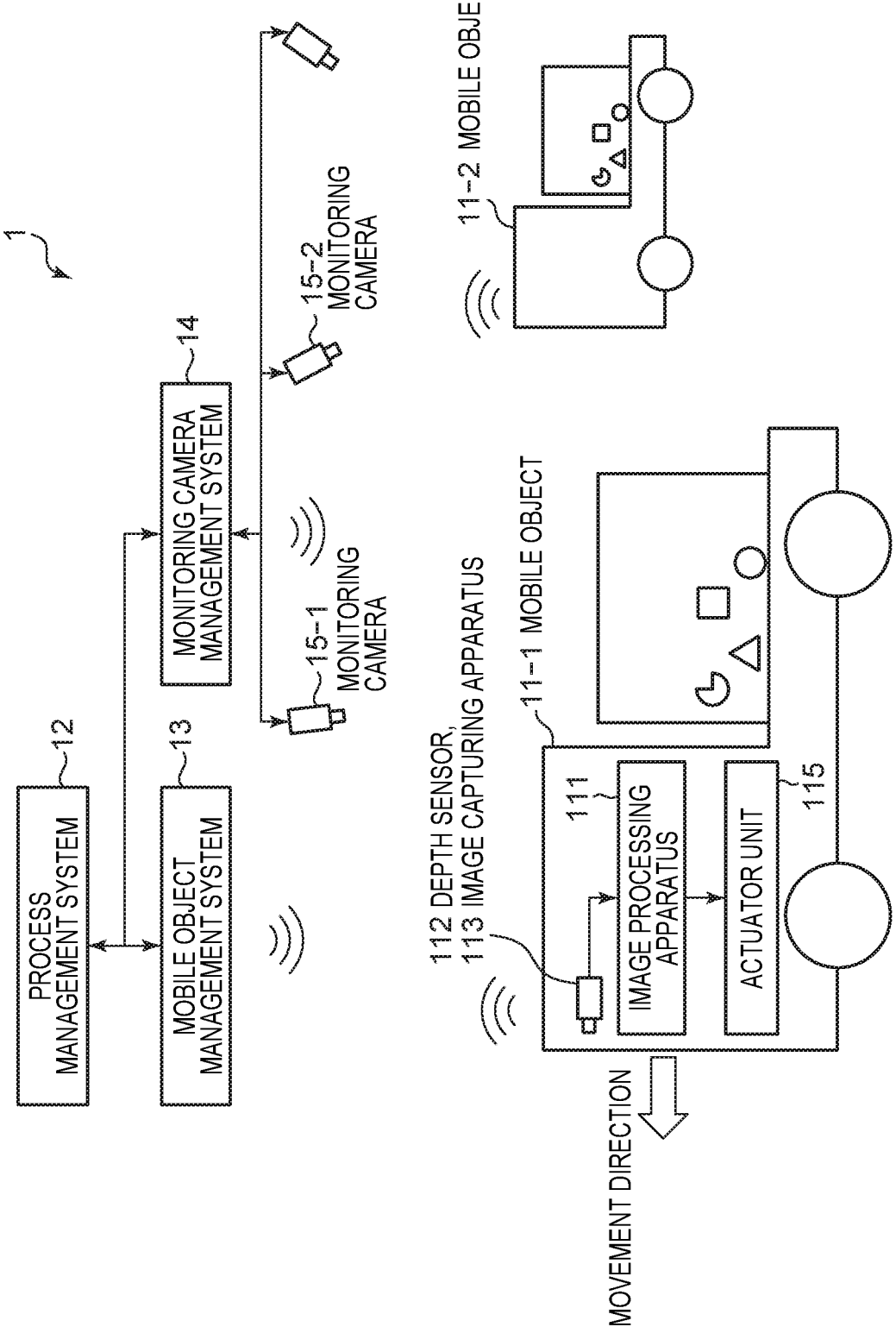
FIG. 1 is a diagram illustrating a system configuration.

FIG. 1 illustrates a configuration of a system in which the present embodiment is applied to a mobile transport vehicle (AGV).

An information processing system 1 is a system that manages a production system or a logistics system. In the present embodiment, the information processing system 1 includes the following parts: at least one or more mobile objects 11 (11-1, 11-2, . . . ); a process management system 12; a mobile object management system 13; a monitoring camera management system 14; and at least one or more monitoring cameras 15 (15-1, 15-2, . . . ).

The mobile objects 11 (11-1, 11-2, . . . ) are each a transport vehicle (AGV) that transports an object in accordance with a process schedule required for task execution in an environment such as a factory or a warehouse in which the mobile objects 11 are used. A plurality of mobile objects 11 may be moving (running) in the same environment. Each mobile object 11 transmits and receives various kinds of information to or from the mobile object management system 13, the monitoring camera management system 14, and another mobile object 11 using wireless communication such as Wi-Fi communication.

The process management system 12 manages schedules of processes executed in the information processing system 1 in a factory or a warehouse. Examples are a production management system, a warehouse management system, a MES (Manufacturing Execution System), and the like. The process management system 12 also communicates with the mobile object management system 13 and the monitoring camera management system 14.

The mobile object management system 13 is a system that manages the mobile objects 11. Examples are a computer server, a PC, an embedded system, a PLC (Programmable Logic Controller), and the like. The mobile object management system 13 transmits and receives various kinds of information for controlling the movement of the mobile objects 11 to and from the mobile objects 11 via wireless communication such as Wi-Fi communication. The mobile object management system 13 also communicates with the process management system 12 and the monitoring camera management system 14.

The monitoring camera management system 14 is a system that manages the monitoring camera 15. Examples are a computer server, a PC, an embedded system, a PLC (Programmable Logic Controller), and the like. The monitoring camera management system 14 transmits and receives various kinds of information for monitoring such as a monitoring camera image acquired by capturing an image of the environment via wired communication such as Ethernet communication or wireless communication such as Wi-Fi communication with the monitoring cameras 15. The monitoring camera management system 14 also transmits and receives various kinds of information to and from the mobile objects 11 via wireless communication such as Wi-Fi communication. The monitoring camera management system 14 also communicates with the process management system 12 and the mobile object management system 13.

Note that the system may be configured so as to include all of the process management system 12, the mobile object management system 13, and the monitoring camera management system 14 described above.

The monitoring camera 15 is a camera having a light receiving sensor that monitors the status of a factory, a warehouse, or other environments in which transport vehicles are used. Specific example thereof is an RGB color camera. The monitoring cameras 15 are installed at positions where it is possible to observe the mobile objects 11. For example, a plurality of monitoring cameras 15 are installed at positions near the ceiling in the environment. Information in terms of a direction in which each monitoring camera faces, the type of the monitoring camera, the installation position of the monitoring camera, and the like is stored in a storage medium of the monitoring camera management system 14. The installation positions and the directions of the monitoring cameras are managed on the world coordinate system defined for each usage environment. The information in terms of the types, the installation positions, the directions, and the like of the monitoring cameras is shared with the process management system 12, the mobile object management system 13, and the mobile objects 11.

Figure 2:
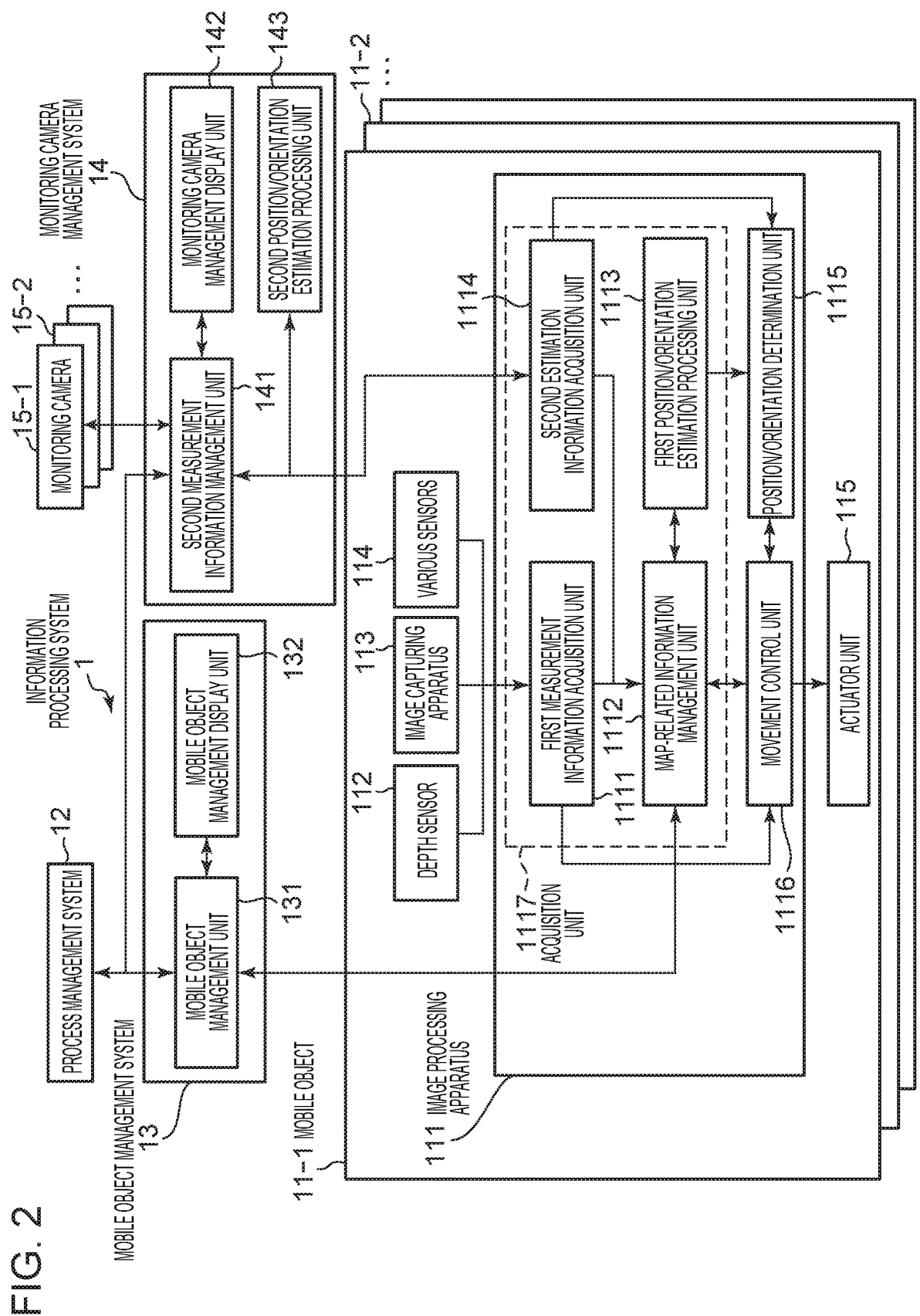
FIG. 2 is a block diagram illustrating a functional configuration of an information processing system.

FIG. 2 is a block diagram illustrating a functional configuration of an information processing system according to the present embodiment applied to mobile objects.

The mobile object 11-1 includes an information processing apparatus 111, a depth sensor 112, an image capturing apparatus 113, various sensors 114, and an actuator unit 115. The mobile objects 11-2, . . . each also have a similar configuration. Note that each mobile object 11 has a marker capable of identifying the position/orientation and the ID thereof and an RFID tag that identifies the ID. The marker provided on each mobile object 11 may be a sticker stuck to the mobile object 11, or the marker may be formed by printing the marker on the surface of the mobile object 11. Alternatively, the marker may be inscribed or embedded on the mobile object 11. Instead of the marker, a symbol or a character string identifying the mobile object 11 may be used. The position and the orientation of the marker with respect to the corresponding mobile object 11 are determined in advance by calibration.

The information processing apparatus 111 includes an acquisition unit 1117, a position/orientation determination unit 1115, and a movement control unit 1116. The acquisition unit 1117 includes a first measurement information acquisition unit 1111, a map-related information management unit 1112, a first position/orientation estimation processing unit 1113, and a second estimation information acquisition unit 1114. The information processing apparatus 111 is, for example, a PC, an embedded system, or a PLC (Programmable Logic Controller).

The first measurement information acquisition unit 1111 acquires first measurement information obtained as a result of measurement by the depth sensor 112 and the image capturing apparatus 113. The first measurement information acquisition unit 1111 sends the first measurement information to the map-related information management unit 1112 and the first position/orientation estimation processing unit 1113. The first measurement information includes distance information (point cloud data or a depth map) provided by the depth sensor and image information provided by the image capturing apparatus. The first measurement information acquisition unit 1111 also acquires movement control sensor information necessary for movement control from the various sensors 114. The movement control sensor information includes odometry information provided by an odometry sensor, angular velocity information provided by an angular velocity sensor, and acceleration information provided by an acceleration sensor. The first measurement information acquisition unit 1111 sends the movement control sensor information to the movement control unit 1116. In the present embodiment, when at least the distance information and the image information are provided, it is possible to estimate the position and the orientation of the mobile object 11.

The map-related information management unit 1112 communicates with the mobile object management unit 131 of the mobile object management system 13 thereby transmitting, receiving, storing, and holding map-related information. The map-related information management unit 1112 also generates, updates, and alters map-related information using first measurement information sent from the first measurement information acquisition unit 1111, and position/orientation information acquired from the position/orientation determination unit 1115. The map-related information management unit 1112 also sends the map-related information to the first position/orientation estimation processing unit 1113, the position/orientation determination unit 1115, and the movement control unit 1116. Note that the map-related information in the present embodiment includes information related to a map of the environment in which the mobile object 11 moves, a route, and a target point.

The map referred to here is a three-dimensional map such as a three-dimensional model of the environment that represents the structure or space of the environment. More specifically, the map is a set of three-dimensional point cloud data (or a combination of three-dimensional point cloud data and color information) and key frame data. The key frame data is data obtained as follows. Depth information viewed from a certain point of view in the environment is quantized into color gradations. A depth map of such depth information is obtained at fixed intervals, and is combined with color information obtained from an image. Note that the key frame data may be any data as long as it is for estimating the position and the orientation. For example, the key frame data may be a combination of depth information and image information (color information) at feature points in an image. The map is generated in advance by moving the mobile object 11 in the environment before the information processing system 1 is operated. For example, the map is generated by combining the sensor information output from the sensors provided on the mobile object 11 while operating the mobile object 11 with a remote controller or manually. Alternatively, the map may be generated using a SLAM (Simultaneous Localization and Mapping) technique when the mobile object 11 autonomously moves in the environment. The SLAM is a technique for recognizing the surrounding environment with a sensor and at the same time accurately estimating the position and the orientation of the mobile object 11. When key frame data is used in a map, first, a key frame is selected that is closest to the position and the orientation estimated in the previous frame, and then, using the position and the orientation of the previous frame, each pixel of the current frame is projected onto the key frame based on the depth map. Next, the position/orientation is estimated by matching the pixel value of the projected frame with the pixel value of the key frame such that the brightness difference is minimized. The position and the orientation of the key frame is updated by a graph optimization method at a predetermined timing such as when the loop is closed. The generated map is sent to and stored in the mobile object management unit 131 of the mobile object management system 13. Note that a change may be made to the map while the information processing system 1 is operating.

The route (the traveling route) is a route along which the mobile object 11 moves in the environment, and is expressed by array data of position information in the world coordinate system in the environment. There is at least one routes. In a case where there are a plurality of routes, the order is predetermined in which routes are to be taken. The route may be predetermined by a user who designs the process, or a change may be made to the route when the information processing system 1 is in operation.

The target point is a point which is a destination toward which the mobile object 11 moves in the environment, and is expressed by position/orientation information in the world coordinate system in the environment. There is at least one or more target points. In a case where there are a plurality of target points, the order is predetermined in which the target points are to be aimed at. The target point may be predetermined by a user who designs the process, or a change may be made to the target point when the information processing system 1 is in operation.

The first position/orientation estimation processing unit 1113 acquires the first measurement information sent from the first measurement information acquisition unit 1111 and the map-related information sent from the map-related information management unit 1112. Then, the first processing result (the information capable of identifying the position and the orientation of the mobile object 11) is estimated using the first processing method. In the present embodiment, it is assumed that SLAM is used as the predetermined first estimation method. When the first measurement information obtained by measuring the environment surrounding the mobile object 11 is input, the SLAM outputs the position/orientation information of the mobile object 11 and the map of the surrounding environment. The first position/orientation estimation processing unit 1113 is capable of acquiring a degree of confidence of the result of the estimation provided by the first processing method. The degree of confidence is a measure indicating the certainty of measurement information or a result of processing based on a processing method. The first position/orientation estimation processing unit 1113 sends the first position/orientation information to the map-related information management unit 1112 and the position/orientation determination unit 1115. Note that in the present embodiment, the position/orientation or the position/orientation information is represented by 6-degree-of-freedom position/orientation parameters given by a combination of a 3-degree-of-freedom parameters (X, Y, Z) indicating the position of the mobile object 11 on the world coordinate system in the environment and a 3-degree-of-freedom parameters (Roll, Pitch, Yaw) indicating the orientation. In addition to the SLAM, the first estimation method may estimate the position/orientation by performing an optimization calculation using the ICP method so as to achieve consistence between the distance information (point cloud data) acquired from the depth sensor 112 and the point cloud data of the map-related information (ICP is an abbreviation for Iterative Closest Point). Alternatively, the position/orientation estimation may be performed by performing matching between the distance information (the depth map) provided from the depth sensor. Depth sensor 112 or feature points of an image captured by the image capturing apparatus 113 and the feature points of the key frame data of the map-related information. Note that the first position/orientation estimation processing unit 1113 may be disposed in the mobile object management system 13.

The second estimation information acquisition unit 1114 communicates with the second measurement information management unit 141 of the monitoring camera management system 14 to acquire the monitoring camera information and the second estimation information including the second processing result. The monitoring camera information refers to a result of recognition of the environment by the second position/orientation estimation processing unit 143 of the monitoring camera management system 14 (in terms of, for example, positions/orientations, types, numbers, etc. of objects, people, mobile objects, etc. existing in the environment), an image captured by the monitoring camera, or the like. As a matter of course, the mobile object 11 may receive the second estimation information and the monitoring camera information not directly from the monitoring camera management system 14 but indirectly therefrom such that the second estimation information and the monitoring camera information are once stored in the mobile object management system 13 and then transferred therefrom to the mobile object 11. The second estimation information acquisition unit 1114 sends the second estimated information to the map-related information management unit 1112 and the position/orientation determination unit 1115. In the present embodiment, the second estimation information refers to information representing a second processing result (information capable of identifying the position and the orientation of the mobile object 11) obtained as a result of recognizing an image of the mobile object 11 and its surrounding captured by some of monitoring cameras 15-1, 15-2, . . . via processing by the second position/orientation estimation processing unit 143 using the second processing method. In the present embodiment, the second estimation information is assumed to be the second processing result of the position/orientation information of the mobile object 11 estimated by the predetermined second estimation method. The second processing method will be described later in detail with reference to the second position/orientation estimation processing unit 143.

The acquisition unit 1117 is an acquisition unit configured to acquire the first processing result of the estimation by the first position/orientation estimation processing unit 1113 and the second processing result of the estimation by the second position/orientation estimation processing unit 143. The acquisition unit 1117 transmits the first processing result and the second processing result to the position/orientation determination unit 1115.

The position/orientation determination unit 1115 generates the position and the orientation (position/orientation information) of the mobile object 11 in world coordinates based on the first processing result and the second processing result acquired from the acquisition unit 1117. In the present embodiment, the position/orientation determination unit 1115 determines the position and the orientation of the mobile object 11 from the first processing result and the second processing result acquired at a certain time from the acquisition unit 1117. The position is given by an intermediate point between the first processing result and the second processing result, and the orientation is given by the average value of the first processing result and the second processing result. The set of coordinate information on the position and the orientation is referred to as the position/orientation information. The generated position/orientation information is sent to the movement control unit 1116 and the map-related information management unit 1112. Note that the position/orientation determination unit 1115 may integrate the position/orientation information estimated by the various methods described above such that weighting coefficients are assigned to respective pieces of position/orientation information and the weighting coefficients are reflected in the integration. The 6-degree-of-freedom parameters indicating the position and the orientation estimated by the respective processing methods are multiplied by weighting coefficients and the results are integrated. Note that weighting coefficients do not include zero. Weighting may be performed using predetermined ratios, or using variables proportional to the degrees of confidence of the respective estimations, or other methods. The position/orientation determination unit 1115 uses the degree of confidence for each estimation result such that the degree of confidence for the estimation result obtained via the first processing method is given by the degree of confidence provided by the first position/orientation estimation processing unit 1113 while the degree of confidence for the estimation result obtained via the second processing method is given by the degree of confidence provided by the second position/orientation estimation processing unit 143. For the first processing result, the degree of confidence may be given by, for example, the degree of confidence of the distance information estimation or the degree of confidence calculated from the matching error between frames. For the second processing result, for example, the degree of confidence thereof may be given by the degree of confidence of recognition by the monitoring camera image. By weighted-integrating the first processing result and the second processing result, it is possible to improve the degree of confidence of the determination of the position or the orientation of the mobile object 11, and thus it becomes possible to achieve high-reliability acquisition of the position or the orientation of the mobile object 11.

The movement control unit 1116 acquires the movement control sensor information sent from the first measurement information acquisition unit 1111, the map-related information sent from the map-related information management unit 1112, and the position/orientation information of the mobile object 11 sent from the position/orientation determination unit 1115. Based on the acquired information, the movement control unit 1116 generates movement control information of the mobile object 11. In the present embodiment, the movement control information includes the rotation torque of wheels of the mobile object 11, the moving direction, the brake (the acceleration), and the like. The movement control unit 1116 sends the movement control information to the actuator unit 115. The movement control unit 1116 may generate and send information for a moving direction indication unit (not shown) to indicate the moving direction by blinking by a blinker or the like based on the route.

The depth sensor 112 is a measuring device that measures the distance (or three-dimensional information or depth information) in a scene in the environment, and includes a light receiving sensor that receives light such as emitted laser light. More specifically, the depth sensor 112 is an active depth sensor represented by Lidar or ToF. It is assumed that the position/orientation relationship between the depth sensor 112 and the mobile object 11 and the position/orientation relationship between the depth sensor 112 and the image capturing apparatus 113 have been calibrated in advance. The depth sensor 112 sends the distance information (the depth map, which is an image of a two-dimensional array of point cloud data) obtained by the measurement to the first measurement information acquisition unit 1111 as the first measurement information.

The image capturing apparatus 113 is an apparatus including a light receiving sensor capable of capturing an image around the mobile object 11, that is, a camera that captures an image of a scene in the environment, and is more specifically an RGB color camera. The image capturing apparatus 113 includes a built-in image sensor such as a CMOS sensor or a CCD sensor. It is assumed that the position/orientation relationship between the image capturing apparatus 113 and the mobile object 11 and the position/orientation relationship between the image capturing apparatus 113 and the depth sensor 112 have been calibrated in advance. The image capturing apparatus 113 sends the image information obtained by the imaging to the first measurement information acquisition unit 1111 as the first measurement information.

The various sensors 114 include, for example, an odometry sensor that measures odometry (position/orientation information obtained from the rotation angle of a wheel) of the mobile object 11, an angular velocity sensor that measures angular velocity, and an acceleration sensor that measures acceleration. The various sensors 114 send movement control sensor information including the odometry information, the angular velocity information, and the acceleration information to the first measurement information acquisition unit 1111.

The actuator unit 115 drives the wheels of the mobile object 11 based on the movement control information regarding the wheel rotation torque, the moving direction, and the brake (the acceleration) sent from the movement control unit 1116.

The process management system 12 has already been described above with reference to FIG. 1.

The mobile object management system 13 includes a mobile object management unit 131 and a mobile object management display unit 132.

The mobile object management unit 131 communicates with the process management system 12 to transmit and receive various kinds of information for executing the process by the mobile object 11. The mobile object management unit 131 stores the map-related information (the map, the route, the target point, etc.) necessary for the mobile object 11 to move in the environment, and transmits the map-related information to the map-related information management unit 1112 for example when the initialization is performed or the processing is advanced or at regular intervals.

The mobile object management display unit 132 is a device that displays the mobile object management information sent from the mobile object management unit 131, and more specifically is a display. The mobile object management display unit 132 displays a map, the position/orientation of the mobile object 11, the route and the target point for each mobile object 11, and the like on the screen of the display. The location of each mobile object 11 may be displayed on the map. The images captured by the image capturing apparatuses 113 of the respective mobile objects may be displayed so that the user can confirm the images.

The monitoring camera management system 14 includes a second measurement information management unit 141, a monitoring camera management display unit 142, and a second position/orientation estimation processing unit 143.

The second measurement information management unit 141 sends the measurement result, which is a monitoring camera image captured by the monitoring camera 15, as second measurement information to the second position/orientation estimation processing unit 143. The monitoring camera 15 is installed at a position where the mobile object 11 can be measured or an image of the mobile object 11 can be captured. Furthermore, the second processing result (the result of the estimation of the position/orientation of the mobile object 11 and the degree of confidence of the recognition result in the second processing method) sent from the second position/orientation estimation processing unit 143 is sent as the second estimation information to the second estimation information acquisition unit 1114. The second measurement information includes an image taken by the monitoring camera 15 and information given by other sensors (not shown) of the monitoring camera 15. Furthermore, the second measurement information management unit 141 communicates with the monitoring camera 15 to transmit and receive the monitoring camera image and various kinds of information for controlling the monitoring camera 15 (for example, for pan/tilt/zoom control, on/off control). The second measurement information management unit 141 communicates with the process management system 12 and transmits and receives various kinds of information such as the work content (instruction as to what should be transported) of each mobile object 11 and the work place (map and coordinate information). The second measurement information management unit 141 holds the monitoring camera images captured by the monitoring cameras 15 such that the monitoring camera images are managed in time series for each monitoring camera. The monitoring camera information refers to a result of recognition of the environment by the second position/orientation estimation processing unit 143 of the monitoring camera management system 14 (in terms of, for example, positions/orientations, types, numbers, etc. of objects, people, mobile objects, etc. existing in the environment), an image captured by the monitoring camera, or the like.

The monitoring camera management display unit 142 is a device that displays the monitoring camera image sent from the second measurement information management unit 141, the second processing result, and the like, and more specifically the monitoring camera management display unit 142 is a display. The monitoring camera management display unit 142 displays the monitoring camera images captured by one or more monitoring cameras 15 side by side in an array on the display screen. Furthermore, the second processing result is superimposed on the monitoring camera image (for example, the detected mobile object 11 displayed such that it is surrounded by a frame). Furthermore, a recognition result may be additionally displayed separately from the above-described second processing result such that the ID of the mobile object 11, load information, position coordinates, and scores such as the degree of confidence of the recognition result, and the like are displayed in the form of a list.

The second position/orientation estimation processing unit 143 inputs the second measurement information including the monitoring camera image acquired from the second measurement information management unit 141 into a predetermined second estimation method to perform an estimation process thereby obtaining a second estimation result indicating a position/orientation of the mobile object 11. In the present embodiment, the second estimation method detects a marker of the mobile object from the monitoring camera image captured by the monitoring camera 15, and estimates the position and the orientation of the mobile object from the feature points of the marker by a geometric transformation (thereby obtaining the second processing result). As a method of detecting feature points, it is known to detect points having a characteristic shape such as a corner or an edge of an object. Detected features are called key points. For example, in order for the monitoring camera 15 to detect the mobile object 11 as an object displayed in an image, a feature point (a key point) of the marker attached to the mobile object 11 is extracted from frames acquired at certain fixed intervals. By detecting the feature point from each of the successive frames, it is possible to track the mobile object 11. The position/orientation of the mobile object can be detected from feature points of a marker in an image by a geometric transformation using Jacobian. The second position/orientation estimation processing unit 143 can acquire the degree of confidence of the result of the estimation made by the second processing method. The second position/orientation estimation processing unit 143 sends the result of the estimation made by the second processing method and its degree of confidence to the second measurement information management unit 141 as second estimation information. The second position/orientation estimation processing unit 143 may perform an object detection or an environment recognition in a range that can be captured by each monitoring camera, in addition to the image recognition for estimating the position/orientation of the mobile object 11. There are various methods of recognizing the environment. Example include a template matching method, a geometric model fitting method, a machine learning method, a deep learning method, and a reinforcement learning method. In order to improve the recognition accuracy, the template, the geometric model, the recognition dictionary, the learning model, and the reward model may be prepared in advance, or may be generated online while the information processing system 1 is in operation. Furthermore, by recognizing IDs from the markers attached to the respective mobile objects 11, it is possible to recognize not only the position/orientation of the mobile objects 11, but also recognize the individuals (IDs) and the number of the mobile objects 11. The second position/orientation estimation processing unit 143 may be disposed in the information processing apparatus 111.

The description of the monitoring camera 15 has already been given with respect to FIG. 1.

Figure 3:
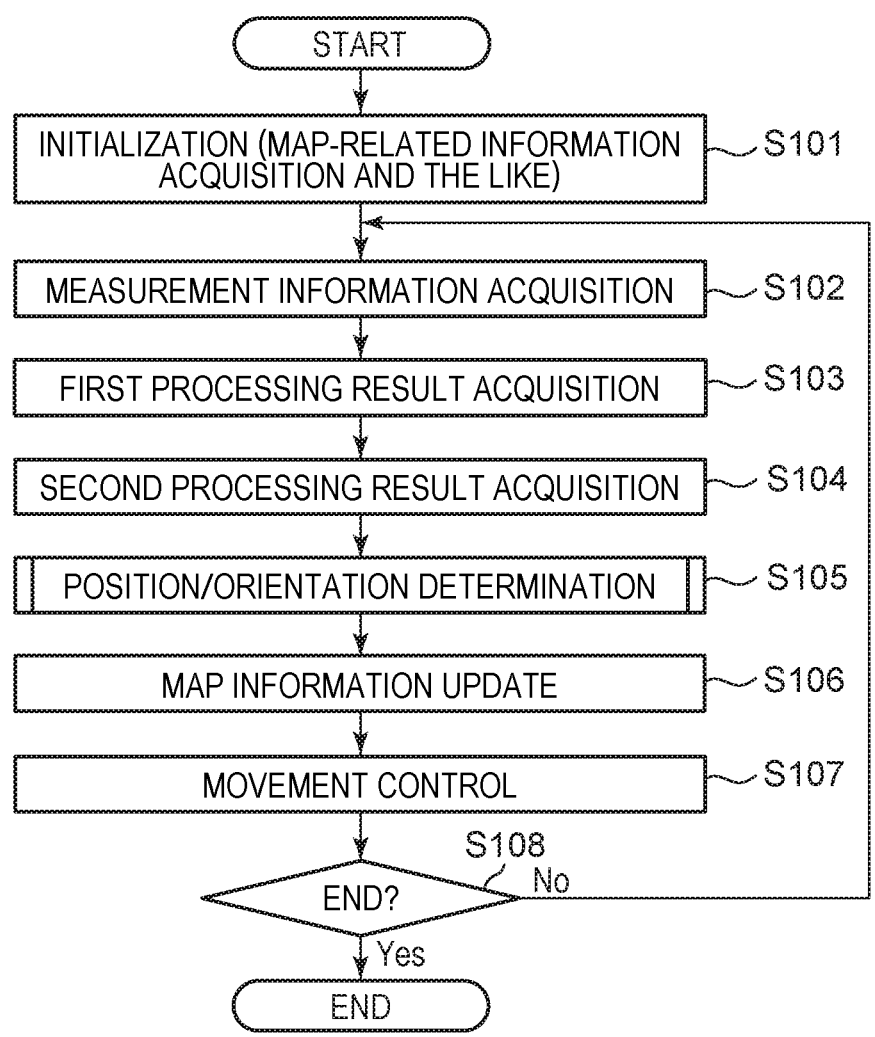
FIG. 3 is a flowchart illustrating a processing procedure performed by an information processing apparatus.

FIG. 3 illustrates a processing procedure performed by the information processing apparatus 111 installed on a mobile object called a transport vehicle (AGV) according to the present embodiment. In the following description, each process (step) will be denoted by a process number with a prefix of S which stands for a step. However, the information processing apparatus 111 does not necessarily need to perform all steps described in the flowchart.

In S101, the information processing apparatus 111 performs initialization processing in which map-related information (a map, a route, a target point, etc.) held by the mobile object management unit 131 is stored into the map-related information management unit 1112. Furthermore, the information processing apparatus 111 acquires initial setting values of the depth sensor 112, the sensor parameters of the image capturing apparatus 113, the camera parameters, the calibration parameters of the various sensors 114, and the parameters used in each functional configuration. The timing of starting the initialization process may be when a user activates the information processing system 1, the mobile object management system 13, or the mobile object 11.

In S102, the first measurement information acquisition unit 1111 acquires distance information of a scene in the environment acquired by the depth sensor 112 and an image of the scene in the environment captured by the image capturing apparatus 113. That is, the distance information provided by the depth sensor 112 and the image information provided by the image capturing apparatus 113 are acquired as first measurement information. Movement control sensor information provided by the various sensors 114 is also acquired.

In S103, the first position/orientation estimation processing unit 1113 estimates the position/orientation information (the first processing result) on the mobile object 11 by the first processing method using the first measurement information and the map-related information (the map) acquired from the map-related information management unit 1112. In a method (the first processing method) of estimating the position or the orientation of the mobile object 11, the estimation is performed by matching the distance information (the depth map) input from the depth sensor 112, the feature points and color information of the image information acquired from the image capturing apparatus 113, and the key frame data of the map-related information.

In S104, the second estimation information acquisition unit 1114 acquires a second processing result from the second measurement information management unit 141. The second processing result is generated via a procedure described below. First, a monitoring camera 15 captures an image of an environment scene in advance according to an instruction issued by the second measurement information management unit 141. The image information captured by the monitoring camera 15 is transmitted, as second measurement information, to the second position/orientation estimation processing unit 143 from the second measurement information management unit 141 transmits. Next, the second position/orientation estimation processing unit 143 estimates the position/orientation information (the second processing result) of the mobile object 11 using the method (the second processing method) described above with reference to the second position/orientation estimation processing unit 143. The recognized second processing result is sent to the second measurement information management unit 141.

Figure 4:
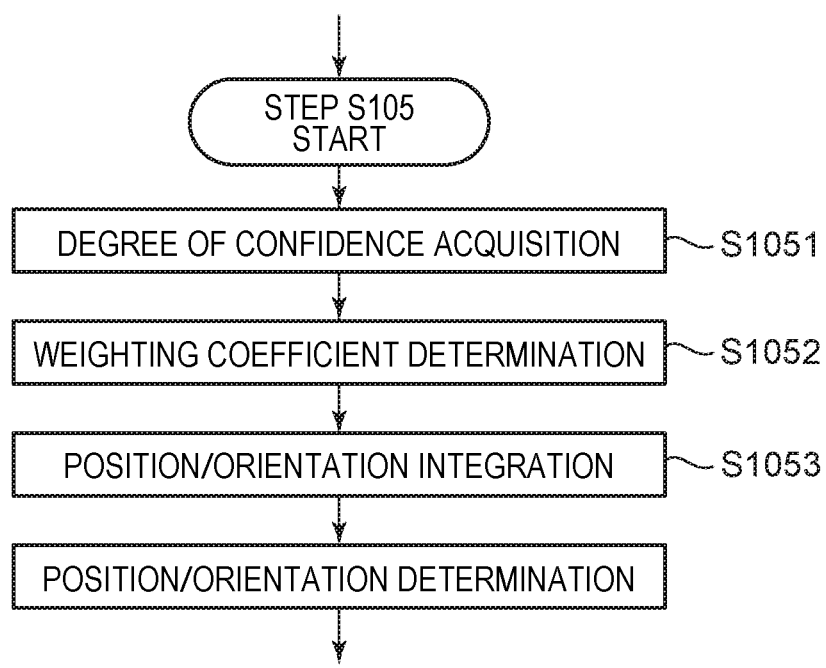
FIG. 4 is a flowchart illustrating a processing procedure performed by an information processing apparatus.

In S105, the position/orientation determination unit 1115 determines the position/orientation information (the position and the orientation) of the mobile object 11 based on the first processing result and the second processing result. Here, the position/orientation information is integrated via the processing procedure by the position/orientation determination unit 1115 shown in FIG. 4. In S1051, a degree of confidence of the first processing result and a degree of confidence of the second processing result are acquired. The degree of confidence of the first processing result is determined by the position/orientation determination unit 1115 or the first position/orientation estimation processing unit 1113 by calculating the degree of property for the first estimation method. Similarly, the degree of confidence of the second processing result is determined by the position/orientation determination unit 1115 or the second position/orientation estimation processing unit 143 by calculating the degree of property for the second estimation method. In S1052, a calculation is performed to determine a first weighting coefficient w1 given to the first processing result and a second weighting coefficient w2 given to the second processing result (for example, w1+w2=1, where 0<w1<1 and 0<w2<1). In the present embodiment, the weighting coefficients are given by predetermined factors (w1=w2=0.5). Note that the weighting coefficients may be determined according to the degrees of confidence acquired in S1051. In a case where the mobile object 11 can be captured by a plurality of cameras, all pieces of the second measurement information are processed based on the second processing method. A plurality of second processing results and degrees of confidence thereof may be respectively calculated, and a second processing result with a high degree of confidence may be used. In S1053, the two processing results are integrated by adding the product of the first processing result and the first weighting coefficient and the product of the second processing result and the second weighting coefficient. Note that the method of integration is not limited to this example.

In S106, the map-related information management unit 1112 updates the map of the environment so as to optimize it based on the latest map-related information held in the map-related information management unit 1112 and the position/orientation information determined by the position/orientation determination unit 1115. For example, in a case where point cloud is used in the map, the point cloud positions are altered by the optimization processing so as to match an actual environment scene. In a case where key frame data is used in the map, the key frame position/orientation is altered by the optimization processing so as to match an actual environment scene. The map-related information including the environment map is originally sent from the mobile object management unit 131. However, when the layout of the environment is changed or when an obstacle is placed, the map becomes inconsistent with the actual environment scene. In view of the above, the map is updated in S106 to handle the situation related to the obstacle or the change in the layout of the environment. Thus, it is possible to reduce the risk that the mobile object 11 collides with the obstacle. In a case where the map is updated in S106 to handle the situation related to a change in the environment layout or existence of an obstacle on a route, it is necessary to change the original map-related information (the route) sent from the mobile object management unit 131. In this case, the map-related information management unit 1112 changes the route. In order to change the route, it is sufficient to know the coordinates of the destination of the mobile object 11 and the current position of the mobile object 11 on the map. The route may be changed by a method such as machine learning, reinforcement learning, or the like. By using such a learning method, a new route is created so as to prevent the mobile object 11 from colliding with the obstacle or the wall. The learning may be performed by a learning unit (not shown) of the information processing apparatus 111, or may be performed using a learning model stored in the mobile object management system 13 and a result may be acquired via communication with the mobile object 11. The latest created route is sent to the movement control unit 1116. Note that S106 is performed only in the case where SLAM is used as the first processing method by the first position/orientation estimation processing unit 1113. In a case where the SLAM technology is not used, S106 is skipped. Note that S105 and S106 are processes executed in parallel.

In S107, the movement control unit 1116 generates movement control information for controlling the movement of the mobile object 11 based on the movement control sensor information, the map-related information (the map, the route, the target point), and the position/orientation information sent from the position/orientation determination unit 1115. More specifically, the movement control information is generated such that, first, the position (the current position) and the orientation (the moving direction) of the mobile object 11 on the route toward the target point in the map are detected, and then control values are determined in terms of a rotational torque of wheels, a moving direction, and a brake required for controlling the mobile object 11 to be directed to the target point. The generated movement control information is used to control the actuator unit 115.

In S108, the information processing apparatus 111 determines whether the operation of the system is completed, that is whether the mobile object 11 has arrived at the target point or whether the user has instructed to stop the system. A condition for determining whether the target point is reached is set in advance. The condition may be set based on the map-related information and the position/orientation information of the mobile object 11, for example, such that the system is terminated when the distance between the world coordinates of the destination and the world coordinates of the mobile object 11 become closer than a predetermined distance, for example, 1 meter. Alternatively, using an RFID or a marker detected by a sensor or a camera, it may be detected whether the mobile object 11 approaches the target point. In a case where a termination instruction is given by the user or the system, there is a possibility that a forced stop instruction is issued by a server or an emergency stop button provided on the mobile object 11 is pressed by a person. In such a case, even when other steps are in the middle of execution, the process may be jumped to S108 to terminate the system. In the case of Yes, the system is terminated as it is. However, in the case of No, the process returns to S102. Note that even in a case where the target point has been reached, if a next target point has been set, the process returns to S102.

For convenience of explanation, the S103 and S104 are executed in this order, but the order may be reversed. Furthermore, S106 and S107 may be processed in parallel.

Figure 5:
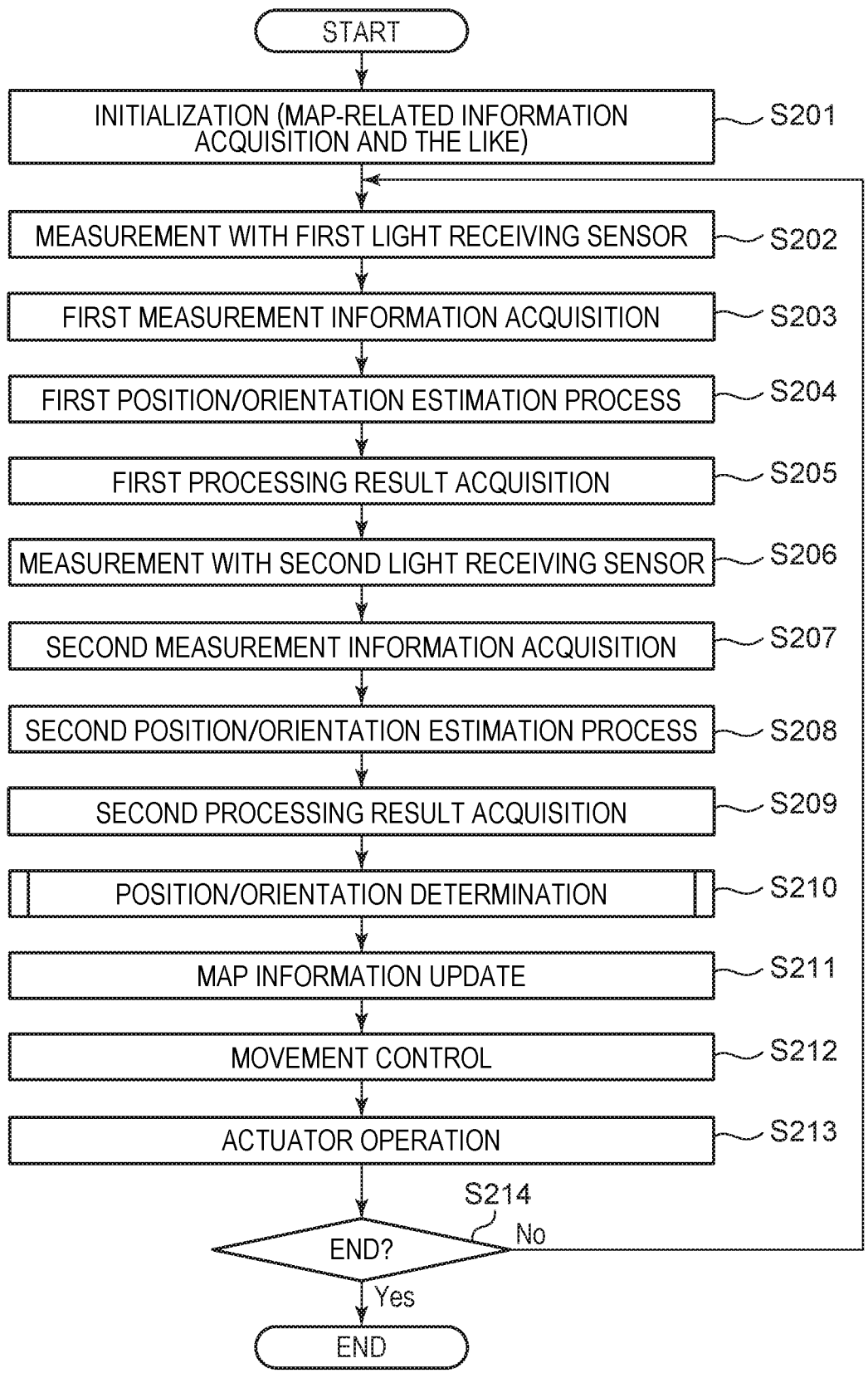
FIG. 5 is a flowchart illustrating a processing procedure performed by an information processing system.

FIG. 5 is a flowchart illustrating a processing procedure performed by an information processing system according to the present embodiment.

In S201, the information processing apparatus 111 initializes the system as in S101.

In S202, the depth sensor 112 and the image capturing apparatus 113 measure the environment around the mobile object 11 in the measurable range with a first light receiving sensor. This measurement result is employed as the first measurement information. In S203, as in S102, the first measurement information acquisition unit 1111 acquires the first measurement information from the depth sensor 112 and the image capturing apparatus 113. The first measurement information acquisition unit 1111 sends the acquired first measurement information to the first position/orientation estimation processing unit 1113. In S204, the first position/orientation estimation processing unit 1113 inputs the first measurement information and the map-related information into the first estimation method to obtain the first processing result. In S205, the position/orientation determination unit 1115 acquires the position/orientation information (the first processing result) related to the mobile object 11, which is the processing result provided by the first position/orientation estimation processing unit 1113. In S206, the monitoring camera 15 serving as the second light receiving sensor captures an image of the mobile object 11 and an image of the environment, in the measurable range, around the mobile object 11. The image information provided by the monitoring camera 15 is employed as the second measurement information. In S207, the second measurement information management unit 141 acquires the second measurement information from the monitoring camera and transmits it to the second position/orientation estimation processing unit 143. In S208, the second position/orientation estimation processing unit 143 inputs the monitoring camera image as the second measurement information into the second estimation method to obtain the second processing result. Here, the second estimation method is a position/orientation estimation method based on an object detection by using a marker provided on the mobile object 11 and by a coordinate transformation. The second processing result is information indicating the position/orientation of the mobile object 11. In S209, the second estimation information acquisition unit 1114 of the information processing apparatus 111 acquires the second processing result from the second measurement information management unit 141. The second estimation information acquisition unit 1114 transmits the second processing result to the position/orientation determination unit 1115. In S210, the position/orientation determination unit 1115 determines the position/orientation of the mobile object 11 using the first processing result and the second processing result. In S211, the map-related information management unit 1112 updates the map-related information. In S212, the movement control unit 1116 calculates the amount of movement of the mobile object 11. In S213, the actuator unit 115 controls a rotation torque, a moving direction, and a brake (acceleration) of wheels of the mobile object 11 by using the movement control information sent from the movement control unit 1116. In S214, the information processing apparatus 111 determines whether to end the movement control. This determination is made based on whether the mobile object 11 has arrived within a 1-meter radius from the destination. In the processing procedure, a process from S202 to S205 and a process from S206 to S209 may be replaced with each other or may be performed in parallel.

The present embodiment is executed using the first estimation result obtained by processing, using the first processing method, the first measurement information and the map-related information provided by the depth sensor and the image capturing apparatus installed on the mobile object 11, and the monitoring camera images captured by the monitoring cameras 15. Then, the position/orientation information of the mobile object 11 is integrated and determined, and the movement control is performed based on it. The position/orientation of the mobile object is determined based on the distance information provided by the depth sensor disposed on the mobile object, the result of the estimation of the position/orientation using the image provided by the image capturing apparatus, and the result of the estimation of the position/orientation of the mobile object using the monitoring camera image, and thus it is possible to achieve high-reliability acquisition of the position/orientation of the mobile object.

Modification 1-1

In the present embodiment, the map is not limited to a three-dimensional map. Furthermore, in the present embodiment, the position/orientation information is not limited to the 6-degree-of-freedom position/orientation parameter. The map may be, for example, two-dimensional point cloud data (combined with color information) on a plane horizontally parallel to the floor of the environment or a two-dimensional model on a plane horizontally parallel to the floor of the environment. The position/orientation information may be represented by position/orientation parameters with a total of 3 degrees of freedom given by a combination of parameters with 2 degrees of freedom indicating the position (the position (X, Y) in a plane horizontally parallel to the floor of the environment) of the mobile object 11 on the world coordinate system in the environment and a parameter with 1 degree of freedom indicating the orientation (the azimuth angle in the plane horizontally parallel to the floor of the environment). The depth sensor 112 may be an active depth sensor configured to acquire distance information (two-dimensional point cloud data) in a scene in a horizontal direction. The position/orientation information is estimated by performing a calculation to determine the best fitting between the distance information (two-dimensional point cloud data) acquired from the depth sensor 112 and the two-dimensional point cloud data of the map-related information by using an ICP (Interactive Closest Point) method.

Modification 1-2

In the present embodiment, the depth sensor 112 is not limited to the active depth sensor. For example, an infrared sensor, a stereo camera, or the like may be used. Furthermore, in the present embodiment, the image capturing apparatus 113 and the monitoring camera 15 are not limited to RGB color cameras. For example, a grayscale camera, an infrared camera, a wide-angle lens camera, a panoramic camera, or the like may be used. The camera used may be a camera capable of panning, tilting, and zooming. The monitoring camera 15 may include a sensor for measuring a distance in addition to a function of capturing an image. The sensor may be, for example, a depth sensor that outputs a two-dimensional point cloud or a three-dimensional point cloud.

Modification 1-3

In the present embodiment, the map is not limited to that generated using the depth sensor or the image capturing apparatus installed on the mobile object 11. For example, a CAD drawing or map image of the environment may be used as it is, or they may be subjected to data format conversion, and the resultant data may be input to the map-related information management unit 1112 and used as the map. Alternatively, the map-related information management unit 1112 may acquire a map based on a CAD drawing or a map image as an initial map, and the map may be updated by the SLAM technology using the sensor provided on the mobile object 11. The map may be updated by overwriting, or the initial map may be held and a difference may be stored as update information. In the latter case, the map may be managed in layers, and the difference may be confirmed on the display screen of the mobile object management display unit 132 or the map may be returned to the initial map. Performing an operation while viewing the display screen provides an improved convenience.

Modification 1-4

In the present embodiment, the maps are not limited to those generated in the same time period of day. For example, a plurality of maps may be generated in different time periods of day, and differences among these maps may be removed by making comparisons among the maps thereby eliminating an object moving in the environment (such as a person, another mobile object 11, or the like) from the map-related information. The eliminating of moving objects from the map-related information makes it possible to achieve higher-reliability estimation of the position/orientation.

Modification 1-5

In the present embodiment, it is assumed that both the depth sensor 112 and the image capturing apparatus 113 are used, but this is by way of example and not limitation. For example, the image capturing apparatus 113 may be used without using the depth sensor 112. In this case, the position/orientation information may be estimated such that distance information (three-dimensional geometric information) is estimated from image information provided by the image capturing apparatus 113 using a CNN (Convolution Neural Network) according to the method disclosed by Tateno et al. ("CNN-SLAM: Real-time dense monocular SLAM with learned depth prediction", IEEE Computer Society Conference CVPR, 2017), and the position/orientation information is estimated using the SLAM technique. Note that the CNN is a neural network including multi-stage layers configured to perform a convolution operation. At each stage of CNN, a convolution operation is performed on the input image to spatially integrate the features of the image and the result is input to the neurons in the intermediate layer at the next stage. Furthermore, an operation called pooling or subsampling is performed to compress the feature values in the spatial domain. By performing the multi-stage feature transformation using the CNN in the above-described manner, it is possible to obtain a complex feature representation. Thus, it is possible to perform a category recognition of a subject existing in the image with high accuracy based on the feature values.

Modification 1-6

In the present embodiment, the position/orientation information estimation by the first position/orientation estimation processing unit 1113 may be performed from the sensor information provided by the sensor disposed on the mobile object 11 and the image provided by the monitoring camera via the optimization process.

In the estimation of the position/orientation information by the first position/orientation estimation processing unit 1113, the strength of a radio wave of a communication device may be used as the first measurement information. For example, the communication status of Wi-Fi communication or a beacon installed in the environment may also be used in the estimation of the position/orientation information.

Modification 1-7

In the present embodiment, the mobile object 11 is not limited to the transport vehicle (AGV). For example, the mobile object 11 may be an automatic guided vehicle, an autonomous vehicle, or an autonomous mobile robot, and the above-described movement control according to the present embodiment may be applied to such a mobile object. Furthermore, the mobile objects 11 are not limited to those that walk or run on land, but mobile objects that fly in the air, move on the water, or move by diving underwater, may be employed as mobile objects 11.

Modification 1-8

In the present embodiment, the mobile object 11 does not require human driving control, but a user may perform remote operation using a GUI as necessary. The user monitors the whole factory using the monitoring cameras 15 and the monitoring camera management system 14, and monitors behaviors of the mobile objects 11. In a case where any signs of abnormal behavior are detected or in a case where a trouble occurs and it is needed to stop part of the factory, a user may intervene in the operation control of a plurality of mobile objects 11 at a time by remote control, which makes it possible to improve the safety and convenience of the entire system.

The second measurement information management unit 141 performs control such that the GUI is displayed together with the monitoring camera image on the monitoring camera management display unit 142. When an instruction to operate the mobile object 11 is issued via the monitoring camera management display unit 142, the movement control information for performing the instructed operation is transmitted to the second estimation information acquisition unit 1114 or the movement control unit 1116.

Figure 6:
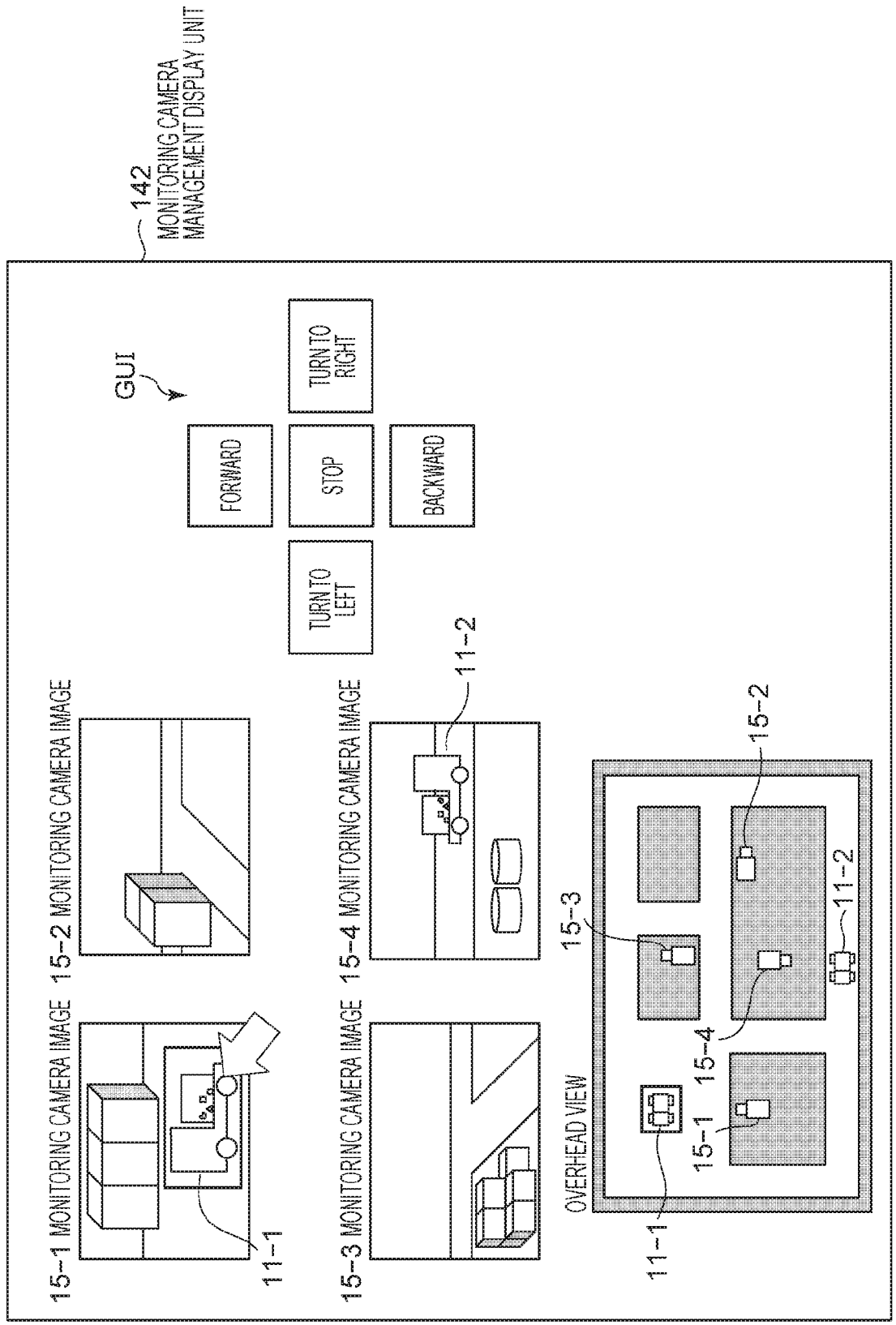
FIG. 6 is a diagram illustrating a GUI of an information processing system.

The monitoring camera management display unit 142 displays the monitoring camera images captured by the plurality of monitoring cameras 15 in an array. Furthermore, the GUI for operating the displayed mobile object 11 is displayed. FIG. 6 illustrates an example of a display screen displayed on the monitoring camera management display unit 142. The user operates, via the GUI, the mobile object 11 (in the example shown in FIG. 6, the mobile object 11-1 displayed in the monitoring camera image 15-1 and selected by using a mouse cursor or by touching the screen). The operation of the mobile object 11 includes a forward movement, stopping, a backward movement, turning to the right, turning to the left, and the like. A user, who manages the factory or the warehouse, may control the operation of the mobile object 11 displayed in the monitoring camera image using the GUI which is also displayed in the monitoring camera image, for example, such that the mobile object 11 is stopped before it collides with some object.

FIG. 17 illustrating a processing procedure performed by the monitoring camera management system 14. In S901, the monitoring camera 15 captures an image of the surrounding. In S902, the second measurement information management unit 141 acquires the image captured by the monitoring camera 15. In S903, the second position/orientation estimation processing unit 143 detects the mobile object 11 from the image captured by the monitoring camera 15. Here, the second estimation method is a position/orientation estimation method based on an object detection by using a marker provided on the mobile object 11 and by a coordinate transformation. In S904, the image obtained as a result of the recognition processing is displayed on a monitoring camera management display unit 142. The detected mobile object 11 may be displayed so as to be surrounded by a frame as shown in FIG. 6. In S905, the monitoring camera management display unit 142 acquires a movement control instruction on the mobile object 11 input by a user. In S906, the second measurement information management unit 141 transmits the second processing result and the information input by the user to the information processing apparatus 111. In a case where an inputting operation for controlling movement is given via a GUI, then in S107 in the flowchart shown in FIG. 3, the movement control unit 1116 generates movement control information using the control information input via the GUI.

Modification 1-9

In the monitoring camera management system 14, in addition to the second position/orientation estimation processing unit 143, the second position/orientation estimation processing unit 143 recognizes objects existing around the mobile object 11. Note that the objects around the mobile object 11 may be other one mobile object 11 moving in the environment, a person, or a load (a falling object) carried by the mobile object 11. The second position/orientation estimation processing unit 143 recognizes an object by using an object detection method such as pattern recognition. More specifically, the detection is performed as follows. First, in S208 in FIG. 5, the second position/orientation estimation processing unit 143 detects an object other than the mobile object 11 from the image included in the second measurement information. The feature points of the object that are not in the image immediately before the estimation process are detected. In S210, the position/orientation determination unit 1115 determines the position/orientation of the mobile object 11 using the first processing result and the second processing result. Here, in a case where an object other than the mobile object is not detected in S208, the first processing result and the second processing result are integrated via the procedure described above to determine the position and the orientation of the mobile object 11. In a case where an object other than the mobile object is detected in S208, the weighting coefficient to be applied to the first processing result obtained in S205 is reduced, and the position and the orientation of the mobile object are determined. This is because when the first measurement information includes a measurement error caused by an existence of the object other than the mobile object, the error may cause a reduction in the accuracy of the first processing result. By detecting an object moving in the environment, it is possible to delete information on an object unnecessary for estimating the position or the orientation of the mobile object, which makes it possible to achieve high-reliability determination of the position of the mobile object.

Modification 1-10

In the present embodiment, as the initialization processing, the position and the orientation of the mobile object 11 at the start of movement may be estimated (as initial setting) by using the image captured by the monitoring camera. For example, referring to the flowchart shown in FIG. 5, in S201, processes from S206 to S209 are additionally performed. In the process in S208 in S201, the second position/orientation estimation processing unit 143 inputs the monitoring camera image as the second measurement information into the second estimation method to obtain the second processing result. The position/orientation determination unit 1115 determines, based on the second processing result, the start position at which the mobile object 11 starts moving. Alternatively, the position/orientation determination unit 1115 may input the monitoring camera image captured by the monitoring camera 15 and makes the determination using a method such as template matching, model fitting, or machine learning, as to the start position on the route where the mobile object 11 starts to move or the orientation thereof.

When the SLAM technology is used as a method for estimating the position/orientation of the mobile object 11, there is no position/orientation information given from the previous frame immediately after the system is initialized, and thus it is necessary to determine the initial position/orientation of the mobile object 11 by using some method. To handle such a situation, when the system initialization is performed, the initial position/orientation information of the mobile object 11 (the start position of the mobile object 11 on the route) may be determined using the second measurement information thereby making it possible to achieve high-reliability estimation of the position of the mobile object.

As a matter of course, the initial position/orientation of the mobile object 11 may be set by a user using the monitoring camera management display unit 142.

Modification 1-11

In the present embodiment, an occurrence of a change in the position or the orientation of an object existing in the environment is determined based on a recognition result provided by the second position/orientation estimation processing unit 143. In a case where it is determined that a change in the position or the orientation of the object has occurred, the mobile object 11 may autonomously move toward the area in the environment where the change has occurred, that is, the area in the environment where the layout has been changed, and the map information is updated. For example, referring to the flowchart shown in FIG. 5, in S208, the second position/orientation estimation processing unit 143 recognizes whether a change has occurred in a position or an orientation of an object existing in the environment using a technique such as template matching, model fitting, machine learning, or the like. The determination of an occurrence of a change in layout is performed as follows. If it is determined, from time-series of images captured by the monitoring camera 15, that an object that did not exist before time t exists in the environment for a period of time u (determined by a user in advance, for example, 1 minute) after time 1, then it is determined that a change in layout has occurred. Conversely, when time series of images captured by the monitoring camera 15 indicates that an object that was observed until time t was not observed in the environment for a period with a predetermined length time or when time series of images indicates a change in position of orientation of an object, it is determined that a change in layout has occurred. Updating of the movement control on the mobile object 11 and updating of the map information are performed such that an area where a change in layout has occurred is projected onto the world coordinate system of the environment and the map information in the area is updated. In the present modification, it is desirable to perform the process using a mobile object 11 assigned no processing task. However, the process may be performed during a period between assigned processing tasks. The second position/orientation estimation processing unit 143 instructs the map-related information management unit 1112 to update the map information for the area in the environment in which a change has been detected in S211. In a case where an occurrence of a change is recognized, it is determined that an occurrence in a change in layout has occurred, and in S212, an area in the environment where the change is detected is set as a destination and the mobile object 11 is controlled so as to move the target point.

When the SLAM technology is not used as a method for estimating the position/orientation information of the mobile object 11, performing updating of the map information for the area where the layout was changed makes it possible to achieve high-reliability acquisition of the position of the mobile object.

Modification 1-12

In the present embodiment, the number of and a distribution of feature points existing in the monitoring camera image are determined based on the recognition result provided by the second position/orientation estimation processing unit 143. The movement is controlled such that the depth sensor or the image sensor installed on the mobile object 11 does not measure or does not capture an image of a region where there are too many or too few feature points. For example, when a mobile object is used in an environment such as a factory, there is often no pattern on the walls or ceiling of the factory, and conversely, there are repeating patterns with the same geometrical features such as blinds. In such a part, it is difficult to find a feature point used in estimating the position. Feature points refer to points such as a corner, an edge, or the like at which a large change occurs, used in estimating the position in the environment. In order to determine the position of the mobile object even in such an environment, a part with a proper number of and a proper distribution of feature points is measured and a result is used as the first measurement information. For this purpose, the number and the distribution of feature points are measured in advance from the second measurement information, and places with a proper number of and a proper distribution of feature points are grasped in advance. For example, referring to the flowchart sown in FIG. 5, in S208, recognition is performed by the second position/orientation estimation processing unit 143 by a known method using a detector or a filter for detecting the number and distribution of feature points and a determination is made as to the number and distribution of the feature points in the environment for each monitoring camera image. In a case where the number of or the distribution of feature points is not within a predetermined range (less than or equal to a first threshold value or greater than or equal to a second threshold value), the number of or the distribution of feature points is too small or too large. Thus, it is determined that the feature points are not proper for use to be measured or captured by the depth sensor or the image capturing apparatus installed on the mobile object 11. An area in which the number of or the distribution of feature points is not proper is projected and converted onto the world coordinate system in the environment, and in S212, the movement control is performed such that the light receiving sensor installed on the mobile object 11 does not measure or capture an image of the area. Alternatively, control may be performed such that the position/orientation determination unit 1115 does not acquire first processing result obtained using first measurement information including, in a measurement range, an area with an improper number of or an improper distribution of feature points. When the number of or the distribution of feature points is too few or too many, control is performed so as to suppress the possibility of acquiring the first measurement information or the first processing result, thereby making it possible to reduce the processing load of the information processing apparatus 111. As a result, it becomes possible to achieve high-reliability acquisition of the position of the mobile object.

Modification 1-13

In the present embodiment, in a case where the remaining capacity of a battery (not shown) of the mobile object 11 is low, the position and the orientation of the mobile object 11 may be estimated based on the second processing result using the monitoring camera information.

By using the battery of the mobile object 11 in an efficient manner, it is possible to achieve high-reliability acquisition of the position of the mobile object.

Modification 1-14

In the present embodiment, the degree of confidence of the second processing result is not limited to the degree of confidence of the recognition based on the monitoring camera image. In a case where a mobile object passes near a monitoring camera, an image of a marker is captured by the monitoring camera such that the size of the marker is large in the image, and thus it is easy to detect the marker. On the other hand, when a mobile object passes far from a monitoring camera, the size of the marker in an image captured by the monitoring camera is small, and thus it is difficult to detect the marker. The farther the mobile object is from the monitoring camera, the larger the position detection error of the marker in the image is or the larger the distortion of the shape of the marker is. Thus, a position error of the marker in the image has a large influence on the estimation of the position or the orientation of the mobile object, which results in a reduction in estimation accuracy. In view of the above, the distance between the position coordinates of the mobile object and the known position coordinates of the monitoring camera may be calculated, and the weighting coefficient used by the position/orientation determination unit 1115 may be employed as the degree of confidence depending on the distance from the monitoring camera 15 to the mobile object 11. As the distance from the monitoring camera 15 to the mobile object 11 increases, the position/orientation estimation accuracy decreases, and thus the degree of confidence is reduced. Alternatively, the degree of confidence may be determined depending on the position in the image where the mobile object 11 is captured by the monitoring camera 15. In many cases, the monitoring camera 15 uses a wide-angle lens, and thus a reduction occurs in the accuracy of position/orientation estimation of the mobile object 11, another object, and a person when their locations on the image are close to an edge. The area of the monitoring camera image is divided into a plurality of rectangles, and when the captured image of the mobile object 11 is located in a rectangle on an edge, the degree of confidence is reduced. By integrating only information on processing results with high degrees of confidence, it is possible to achieve high-reliability acquisition of the position of the mobile object.

Modification 1-15

In the present embodiment, the number of monitoring cameras 15 for capturing an image of one mobile object 11 is not limited to one, but a plurality of monitoring cameras 15 may be used. For example, images of the mobile object 11-1 may be captured by the monitoring cameras 15-1 and 15-2. The monitoring camera 15-1 and the monitoring camera 15-2 are installed at locations where the mobile object 11 can be measured or an image thereof can be captured, and the position and the orientation of each camera are known. Referring to the flowchart shown in FIG. 5, in S206, images are captured using the respective monitoring cameras 15-1 and 15-2. Next, in S208, the position/orientation information on the mobile object 11-1 is recognized from each of the monitoring camera images using the second position/orientation estimation processing unit 143. Furthermore, the second position/orientation estimation processing unit 143 detects the mobile object 11-1 and performs coordinate transformation on the position and the orientation, respectively, on the world coordinate system thereby estimating the position/orientation (a plurality of second processing results). In S209, a plurality of pieces of second estimation information (second processing results) are input via the second estimation information acquisition unit 1114. Furthermore, in S204, the first position/orientation estimation processing unit 1113 estimates the first processing result using the first measurement information sent from the first measurement information acquisition unit 1111 and map-related information sent from the map-related information management unit 1112. In S210, the plurality of second processing results acquired in S209 and the first processing result acquired in S204 are integrated with weights. Weighting may be performed using predetermined ratios, or using variables proportional to the degrees of confidence of the respective estimations, or other methods. Alternatively, position/orientation information with the highest degree of confidence may be selected. The number of monitoring cameras 15 for capturing the image of the mobile object 11-1 is not limited to two, but three or more monitoring cameras 15 may be used.

By integrating processing results using only information with high degrees of confidence in terms of images captured from a plurality of viewpoint or processing results, it possible to achieve high-reliability acquisition of the position of the mobile object. Furthermore, by integrating processing results by the mobile object, it is possible to reduce the processing load of the monitoring camera management system 14.

The plurality of second processing results obtained by second position/orientation estimation processing unit 143 may be integrated into one second processing result when S208 or S209 is performed. The second position/orientation estimation processing unit 143 determines weighting coefficients using variables proportional to the degrees of confidence determined for the respective estimations, and integrates the estimation results. Alternatively, position/orientation information with the highest degree of confidence may be selected. Alternatively, for example, the average value or median value of the plurality of second processing results may be employed. By integrating the second processing results by the monitoring camera management system 14, it becomes possible to reduce the processing load on the information processing apparatus 111.

Modification 1-16

In the present embodiment, timing of obtaining the first measurement information, the estimation rate of the first processing result and the second processing result (the time interval for performing position/orientation estimation process) or the timing of performing the estimation may be set to arbitrary values or arbitrary timing. For example, the timing may be set such that processes are performed in parallel. However, this may prevent the estimation rates or the estimation timings to be exactly match.

First, an explanation is given for a case where the estimation rates do not exactly match. For example, a discussion is made below for a case where the estimation rate of the first processing result is high (60 executions per second) and the estimation rate of the second processing result is low (5 executions per second). If the position/orientation information is integrated with weights by the position/orientation determination unit 1115 in synchronization with the timing of estimating the first processing result, then the estimation made in the past is used for the second processing result, which may cause a reduction in the position/orientation estimation accuracy. On the other hand, if the position/orientation information is integrated in synchronization with the timing of estimating the second processing result, then the result is that position/orientation information is determined at a low estimation rate. To handle the above situation, the first processing result and the second processing result are estimated and integrated at time t1, and then, during a period until time t1+v at which the first processing result and the second processing result are estimated for the next time, the position/orientation of the mobile object 11 is determined from the latest first processing result each time the first processing result is estimated. Alternatively, the position/orientation information is obtained by adding a difference given as a movement amount estimated from the product of the speed of the mobile object and an elapsed time to the second processing result at time t1, and the resultant position/orientation information is used as the second processing result. When the first processing result and the second processing result are estimated at time t1+v, the first processing result and the second processing result are integrated as at time t1.

Next, a description is given below for a case where the estimation timings do not exactly match. For example, let it be assumed that the environment is measured by the sensor or an image of the environment is captured by the monitoring camera at a certain time t2, and then at time t2+w1 the first processing result is estimated by the position/orientation determination unit 1115, and thereafter at time t2+w2, the second processing result is estimated (where it is assumed that the second processing result is estimated after the estimation of the first processing result, and thus w1<w2). In this case, when the position/orientation information is integrated by the position/orientation determination unit 1115, it is desirable to use depth sensor information measured or images captured at approximately the same time as the position/orientation information to be integrated. In view of the above, a time stamp indicating a time of measurement or image capturing is added to the depth sensor information and the image information, and integrating is performed using the position/orientation information estimated from the depth sensor information and the image information obtained at the same time.

Alternatively, when the second processing result is estimated at time t2+w2, the position/orientation information at time t2 may be corrected with reference to the time stamp. In a case the first processing result is estimated, for example, using the SLAM technique, the position/orientation information after time t2 can be updated by correcting the position/orientation information estimated in the past. Furthermore, when the processing result is determined to have a large delay in position/orientation estimation with reference to the time stamp, it is determined that the degree of confidence is low and the weighting coefficient is reduced. The position of the mobile object can be stably acquired by integrating the processing results that match the measurement timing and the integration time of the estimation result. It is possible to achieve high-reliability acquisition of the position of the mobile object.

Modification 1-17

In the present embodiment, the depth sensor 112, the image capturing apparatus 113, and the monitoring camera 15 may be configured such that a light receiving part of each image sensor unit includes two or more image sensor devices so as to function as an image capturing apparatus capable of outputting both distance information and image information.

Modification 1-18

The information processing apparatus 111 does not need to be installed on a mobile object. For example, the information processing apparatus 111 may be disposed in the mobile object management system 13. In this case, in S202 in FIG. 5, the depth sensor 112, the image capturing apparatus 113, and various sensors 114 installed on each mobile object 11-1 observe or measure the surroundings of the mobile object. Each mobile object 11-1 transmits an observation result or a measurement result obtained in the observation or the measurement to the information processing apparatus in the mobile object management system 13 via a network. Then in S203, the first measurement information acquisition unit disposed in the information processing apparatus in the mobile object management system 13 acquires the measurement result provided by the sensor disposed on the mobile object. The information processing apparatus determines the position or the orientation of each mobile object by executing the first estimation method or the second estimation method described above based on the measurement result, and transmits the determined position or orientation to each mobile object. Each mobile object generates movement control information based on a position and an orientation received in movement control unit 1116, and thereby controlling an actuator unit 115. It is easier to use, for example, a high-performance hardware apparatus with a physically large size as the information processing apparatus 111 in the mobile object management system 13 than to use such a hardware apparatus as the information processing apparatus installed on the mobile object. That is, the present modification makes it possible to achieve higher accuracy in estimation of the position of each mobile object.

Embodiment 2

In Embodiment 2 described below, the present invention is applied to an estimation of a position of a mobile object.

Even in a case where a plurality of monitoring cameras are installed in the environment, there can be a blind spot that can not be detected by the plurality of monitoring cameras. In order to make it possible to achieve high-reliability acquisition of the position and the orientation of the mobile object even in an area that can not be detected by the monitoring camera, a marker for identifying a position is installed in the environment. This marker is a two-dimensional plane marker with an ID whose position and orientation in the environment are known. The mobile object captures an image of the marker thereby estimating the current position and orientation of the moving object. In the present embodiment, two image capturing apparatuses are installed on the mobile object, and first measurement information is obtained by the depth sensor and the image capturing apparatus installed on the mobile object and map-related information are input to the first processing method thereby estimating the first processing result. Using this first processing result, the position and the orientation of the mobile object is estimated. In a case where a marker disposed in advance in the environment is grasped in an image captured by the other image capturing apparatus installed on the mobile object, the position and the orientation of the mobile object are detected from the captured image using the second processing method thereby estimating the position/orientation of the mobile object.

(Description of Configuration)

In the present embodiment, a plurality of two-dimensional plane markers each having an attached ID whose position and orientation in the environment are known are fixedly installed in the environment. Use of the marker makes it possible to acquire an absolute position on the world coordinate system. This makes it possible to correct an error of the estimated position or orientation accumulated during the movement until reaching the marker from the actual position of the mobile object. The position and the orientation of the ID marker recognized from image information captured by the image capturing apparatus 113b are coordinate-transformed thereby estimating the position and the orientation of the mobile object 11. ID markers are installed in advance on a floor, a ceiling, a specific object, and a standing signboard in the environment. Instead of an ID marker, a marker with no ID may be used. Use of the ID marker makes it possible to associate each ID marker number with its position, for example, such that a marker with an ID number of 100 is at a position (x, y, z) on the world coordinate system. In a case where there is no ID, only position coordinates are read. Note that the marker used here is physically the same as that used in Embodiment 1, but the installation location thereof is different.

Figure 7:
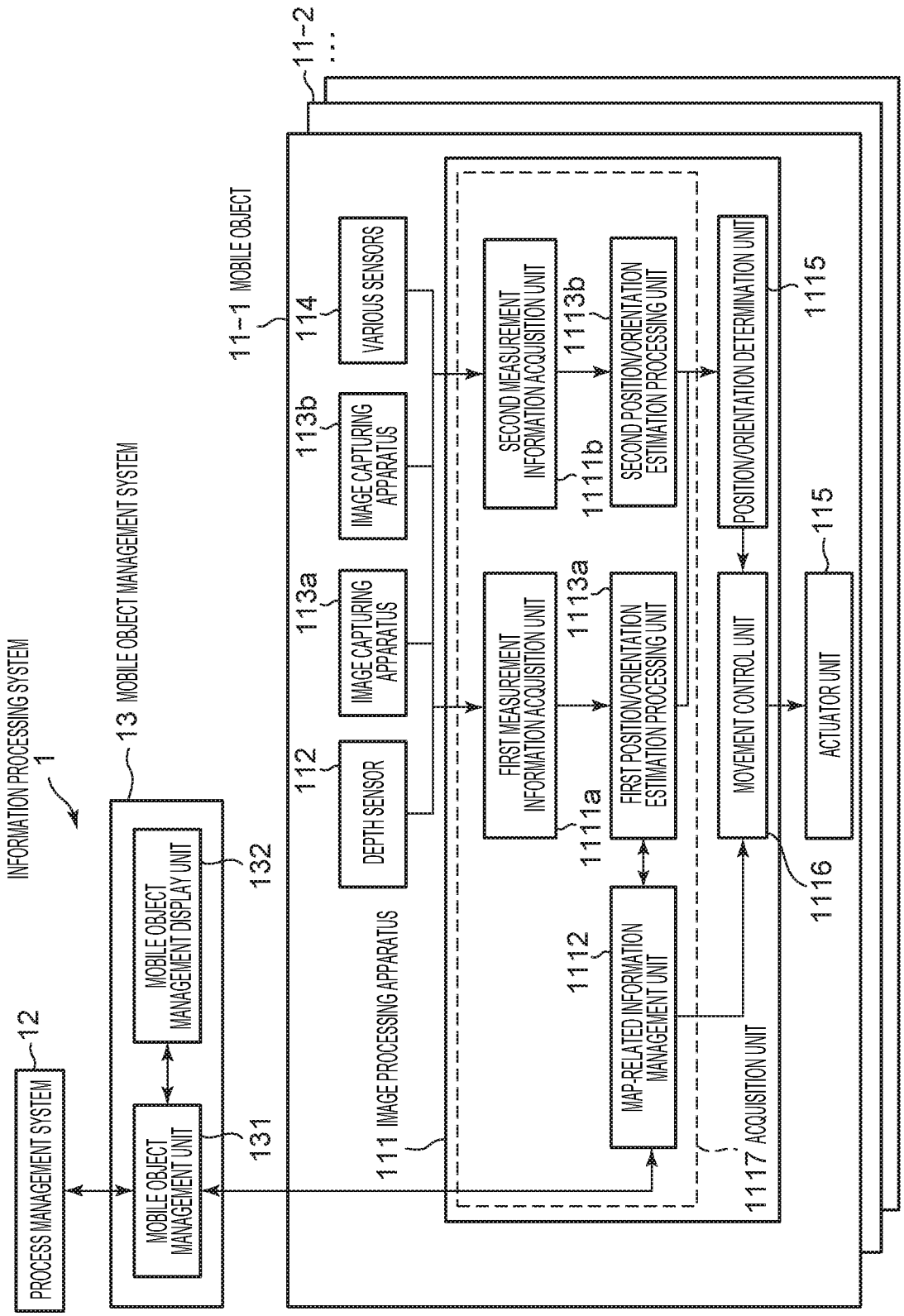
FIG. 7 is a block diagram illustrating a functional configuration of an information processing system.

FIG. 7 is a diagram illustrating a functional configuration of an information processing system according to the present embodiment. Many parts are similar to those according to Embodiment 1 described above with reference to FIGS. 1 and 2. However, functions of some parts are different from those in Embodiment 1. In the present embodiment, only parts different in function from Embodiment 1 are described, but the other parts which are the same in function as those in FIG. 1 or 2 are not described again.

In the present embodiment, the mobile object 11 has two image capturing apparatuses installed thereon. An image capturing apparatus 113a captures an image of the environment around the mobile object 11 and sends image information to the first measurement information acquisition unit 1111a, as with the image capturing apparatus 113 in Embodiment 1. The image capturing apparatus 113b is a camera that captures an image of the marker installed in an area in the environment measurable by the mobile object 11 using the image capturing apparatus 113b. The marker is a black-and-white bar-code and thus the image capturing apparatus 113b does not need to be a color camera, but any camera capable of acquiring a black-and-white image or a grayscale image may be used.

A first measurement information acquisition unit 1111a acquires first measurement information from the depth sensor 112 and the image capturing apparatus 113a. The first measurement information acquisition unit 1111a sends the acquired first measurement information to the map-related information management unit 1112 and the first position/orientation estimation processing unit 1113a.

A second measurement information acquisition unit 1111b acquires second measurement information from the image capturing apparatus 113b. The second measurement information acquisition unit 1111b sends the acquired measurement information to the map-related information management unit 1112 and the second position/orientation estimation processing unit 1113b.

A first position/orientation estimation processing unit 1113a is similar to the first position/orientation estimation processing unit 1113 in Embodiment 1. By processing the first measurement information and the map-related information using the first processing method (SLAM), the position/orientation of the mobile object 11 is estimated.

When the second position/orientation estimation processing unit 1113b estimates the position/orientation information of the mobile object 11, the second position/orientation estimation processing unit 1113b detects a marker placed in the environment from the second measurement information acquired by the image capturing apparatus 113b. When the marker is detected, absolute position coordinates in the world coordinate system can be acquired as a second processing result. Furthermore, the orientation of the mobile object 11 is acquired as the second processing result from a distortion degree or an inclination of the marker in the image.

The position/orientation determination unit 1115 determines the position and the orientation of the mobile object 11 using the first processing result from the first position/orientation estimation processing unit 1113a. Alternatively, the second processing result may be acquired from the second position/orientation estimation processing unit 1113b, and the position and the orientation of the mobile object 11 may be determined. Alternatively, as in Embodiment 1, the first processing result and the two processing results may be integrated. The integration method may be similar to that by the position/orientation determination unit 1115 according to the first embodiment, but when the second processing result can be acquired, the weighting coefficient to be applied to the second processing result is set to be large.

Figure 8:
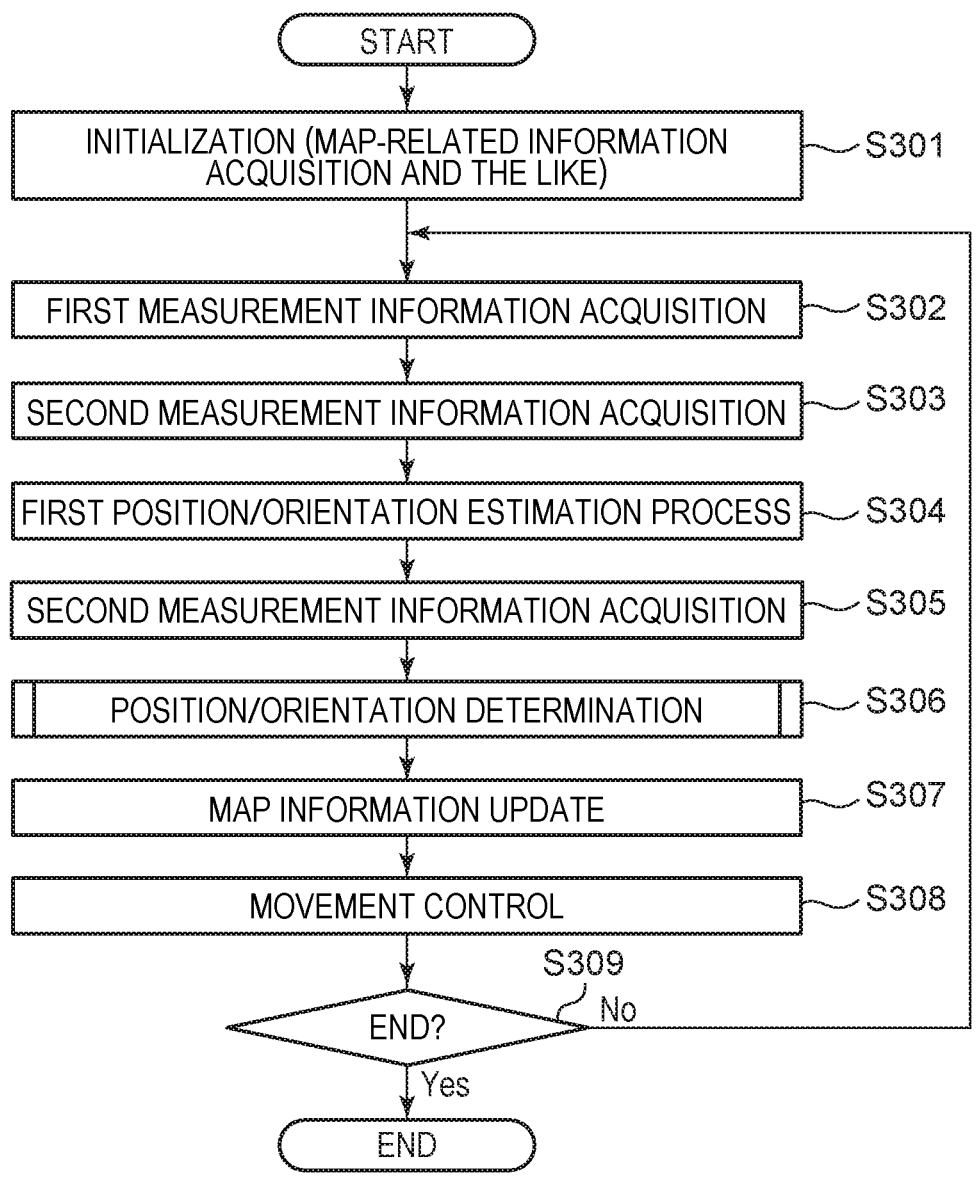
FIG. 8 is a flowchart illustrating a processing procedure performed by an information processing apparatus.

FIG. 8 illustrates a processing procedure, relating to the operation of a mobile object called a transport vehicle (AGV), performed by the information processing apparatus according to the present embodiment. In the present embodiment, only part of the procedure different from that in Embodiment 1 will be described, and the same part of the procedure as that shown in FIG. 3 will not be described.

In S302, the first measurement information acquisition unit 1111a acquires distance information from the depth sensor 112 and an image from the image capturing apparatus 113a as first measurement information. In S303, the second measurement information acquisition unit 1111b acquires an image from the image capturing apparatus 113b as second measurement information. In S304, the first position/orientation estimation processing unit 1113a inputs the first measurement information and the map-related information to the first processing method to obtain a first processing result. Here, the first processing method is SLAM as in Embodiment 1.

In S305, the second position/orientation estimation processing unit 1113b inputs the second measurement information to the second processing method to obtain a second processing result. The second processing method uses an image recognition technique to detect a marker from the image. In a case where a marker is not detected in this process, the movement distance from the immediately previous marker may be calculated and the current position of the mobile object 11 may be estimated from the movement distance and the immediately previous position coordinates of the marker.

In S306, the position/orientation determination unit 1115 determines the position and the orientation of the mobile object 11. In a case where a marker is detected in the second position/orientation estimation, the position and the orientation of the mobile object 11 are determined using the second processing result. Alternatively, the position/orientation of the mobile object 11 may be determined from two position/orientation estimation processing results as in the sub-flow in FIG. 4. Note that in the present embodiment, in the case where a marker is detected in the second position/orientation estimation, the weighting coefficient applied to the second position/orientation estimation result is set to be larger than the weighting coefficient applied to the first position/orientation estimation result. In a case where no marker is detected, the position and the orientation are determined using the first processing result.

S307 and following processes are similar to S106 and following processes in Embodiment 1.

The installing of the marker makes it possible to achieve high-reliability acquisition of the position of the mobile object even in an area that cannot be detected by the monitoring camera. Use of the marker makes it possible to acquire an absolute position on the world coordinate system. This makes it possible to correct an error of the estimated position or orientation accumulated during the movement until reaching the marker from the actual position of the mobile object. Thus it becomes possible to achieve high-reliability acquisition of the position of the mobile object.

Embodiment 3

In Embodiment 3 described below, the present invention is applied to an estimation of a position of a mobile object.

Even in a case where a plurality of monitoring cameras are installed in the environment, there can be a blind spot that can not be detected by the plurality of monitoring cameras. To handle this situation, a marker is installed to make it possible to achieve high-reliability acquisition of the position of the mobile object even in an area that cannot be detected by the monitoring camera. Use of the marker makes it possible to acquire an absolute position on the world coordinate system. This makes it possible to correct an error of the estimated position or orientation accumulated during the movement until reaching the marker from the actual position of the mobile object. Thus it becomes possible to achieve high-reliability acquisition of the position of the mobile object. In the present embodiment, the mobile object 11 has one image capturing apparatus installed thereon. Even when only one type of image is acquired, it is possible to achieve high-reliability acquisition of the position of the mobile object by performing a plurality of estimation processes. Furthermore, only one image capturing apparatus is installed on the mobile object, and thus an increase in the degree of freedom in terms of the installation position of the second image capturing apparatus. For example, by using the second image capturing apparatus as a monitoring camera installed in the environment as in Embodiment 1, it becomes possible to observe the mobile object from a plurality of points of view, which makes it possible to execute the estimation of the position or the orientation of the mobile object by a plurality of methods. In the present embodiment, the position/orientation of the mobile object is estimated using the first processing result obtained by inputting the first measurement information provided by the depth sensor and the image capturing apparatus installed on the mobile object together with the map-related information into the first processing method. In a case where the image captured by this image capturing apparatus installed on the mobile object 11 grasps the marker installed in advance in the environment, the estimation of the position/orientation of the mobile object is performed using the second processing method by which the position and the orientation of the mobile object are detected from the image.

(Description of Configuration)

In the present embodiment, as in Embodiment 2, a plurality of two-dimensional plane markers each having an attached ID whose position/orientation in the environment is known are fixedly installed in the environment. A difference from Embodiment 2 is that the mobile object 11 has only one image capturing apparatus installed thereon.

Figure 9:
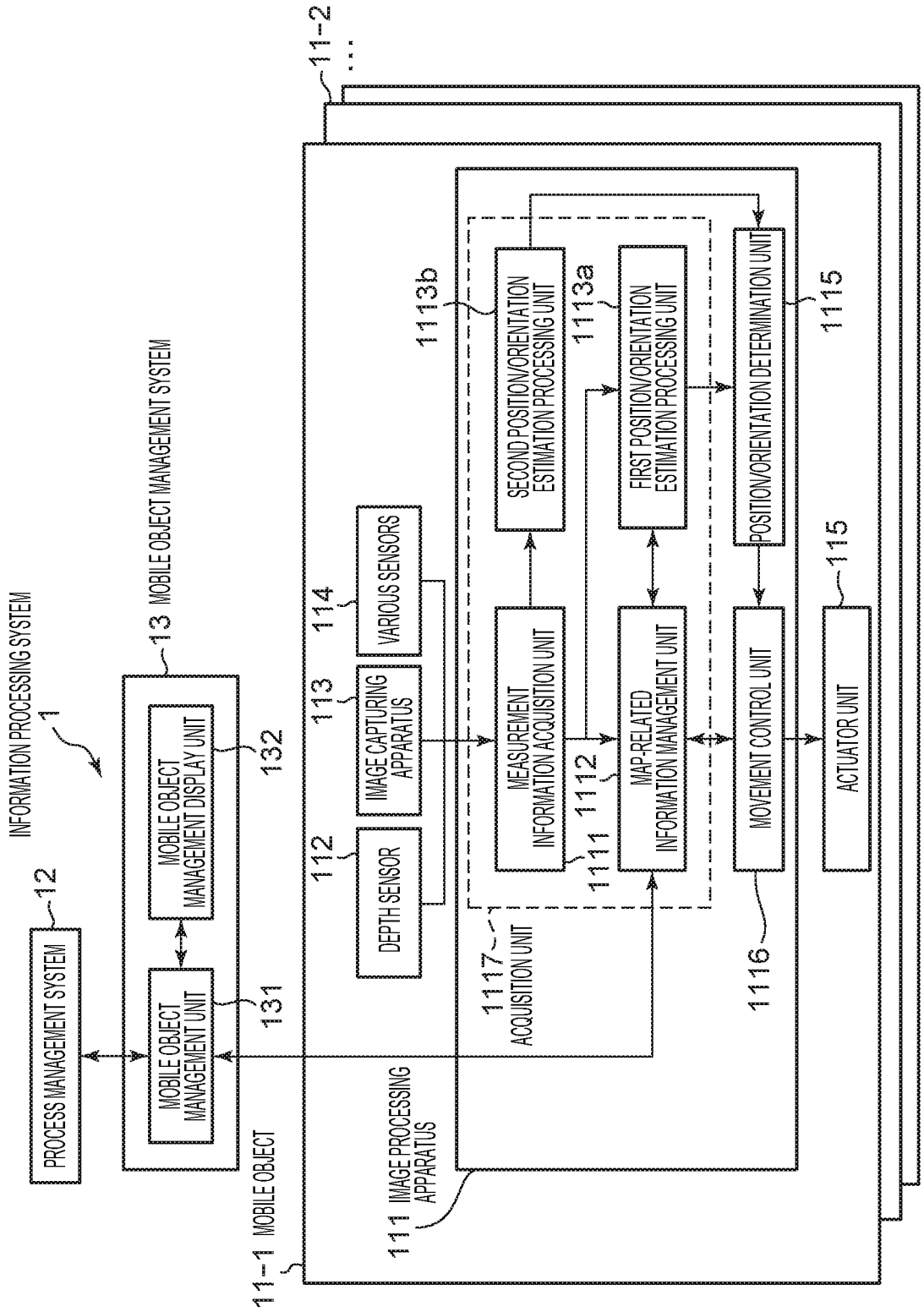
FIG. 9 is a block diagram illustrating a functional configuration of an information processing system.

FIG. 9 is a diagram illustrating a functional configuration of the information processing system according to the present embodiment. Many parts are similar to those according to Embodiment 2 described above with reference to FIG. 1 and FIG. 7. However, functions of some parts are different from those in Embodiment 2. In the present embodiment, only parts different in function from Embodiment 2 are described, but the other parts which are the same in function as those in FIG. 1 or 7 are not described again.

In the present embodiment, it is sufficient to install only one image capturing apparatus on the mobile object 11. The image capturing apparatus 113 is a color camera for capturing an image of the environment around the mobile object 11 and acquiring an image for detecting a marker installed in the environment.

The measurement information acquisition unit 1111 acquires measurement information from the depth sensor 112 and the image capturing apparatus 113. The measurement information acquisition unit 1111 sends the acquired measurement information to the map-related information management unit 1112, the first position/orientation estimation processing unit 1113a, and the second position/orientation estimation processing unit 1113b.

A first position/orientation estimation processing unit 1113a is similar to the first position/orientation estimation processing unit 1113 in Embodiment 1. The measurement information sent from the measurement information acquisition unit 1111 and the map-related information sent from the map-related information management unit 1112 are input to the first processing method (SLAM) to estimate the position/orientation of the mobile object 11.

When the position/orientation information of the mobile object 11 is estimated, the second position/orientation estimation processing unit 1113b detects a marker placed in the environment from the measurement information acquired by the image capturing apparatus 113. When the marker is detected, absolute position coordinates in the world coordinate system can be acquired as a second processing result. Furthermore, the orientation of the mobile object 11 is acquired as the second processing result from a distortion degree or an inclination of the marker in the image.

Figure 10:
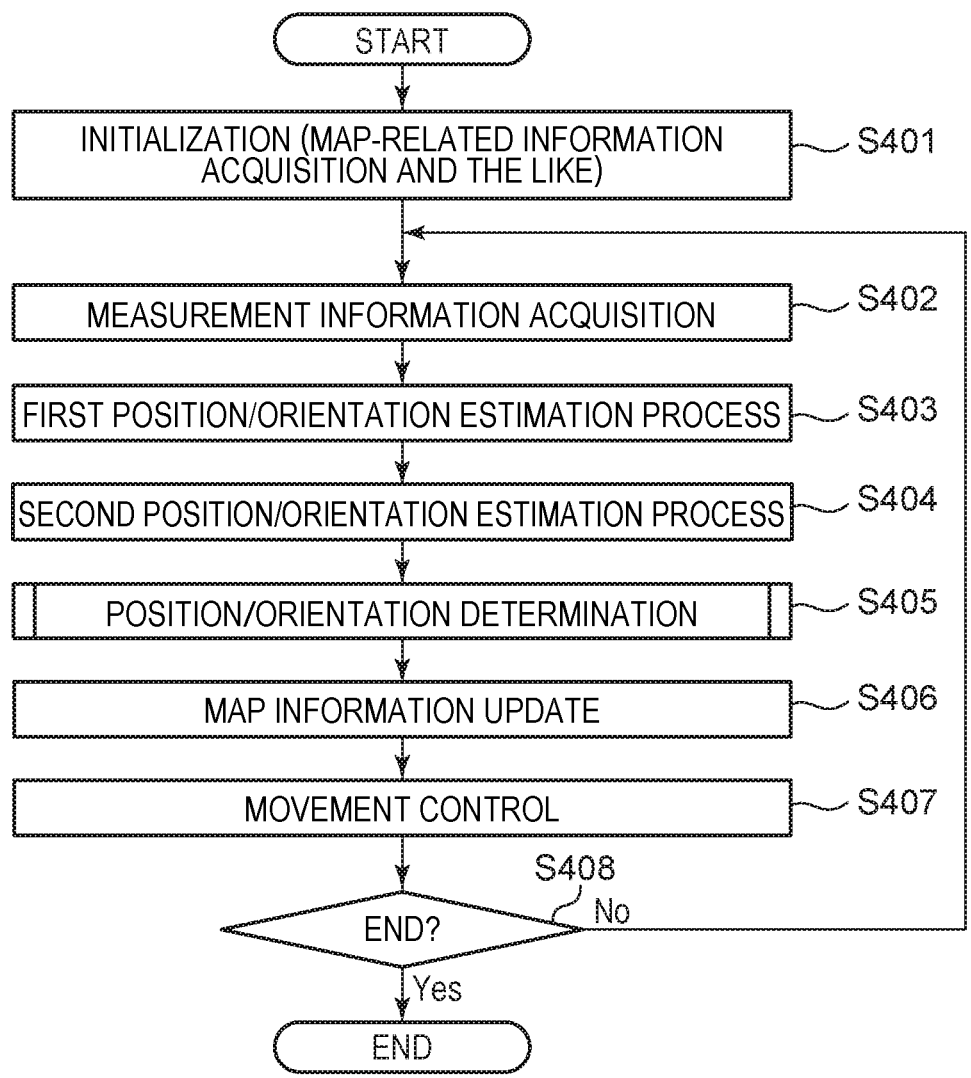
FIG. 10 is a flowchart illustrating a processing procedure performed by an information processing apparatus.

FIG. 10 illustrates a processing procedure, relating to the operation of a mobile object called a transport vehicle (AGV), performed by the information processing apparatus according to the present embodiment. In the present embodiment, only part of the procedure different from that in Embodiment 2 are described, but the other parts of the procedure, which are the same as those shown in FIG. 8.

In S402, the measurement information acquisition unit 1111 acquires distance information from the depth sensor 112 and an image from the image capturing apparatus 113 as measurement information. In S403, the first position/orientation estimation processing unit 1113a inputs the first measurement information and the map-related information into the first processing method to obtain a first processing result. Here, the first processing method is SLAM as in Embodiment 1.

In S404, the second position/orientation estimation processing unit 1113b inputs the measurement information acquired in S402 into the second processing method to obtain a second processing result. The second processing method uses an image recognition technique to detect a marker from the image. Absolute position coordinates in the world coordinate system are acquired as the second processing result. In a case where a marker is not detected in this process, the movement distance from the immediately previous marker may be calculated and the current position of the mobile object 11 may be estimated from the movement distance and the immediately previous position coordinates of the marker. S405 and following processes are similar to S306 and following processes in Embodiment 2.

Embodiment 4

In Embodiment 4, the invention is applied to movement control on a mobile object.

If the mobile object 11 deviates from a correct route, an increase occurs in a safety risk that the mobile object 11 collides with another mobile object or apparatus. From a point of view of a production control, an increase occurs in the risk that the production process is not performed as planned. Therefore, it is desirable to control the operation such that the deviation of the mobile object 11 from the route is as small as possible. In the present embodiment, a relative distance of the mobile object from the route is determined using the route of the mobile object 11 included in the map-related information, and the second processing result estimated by inputting the monitoring camera image to the second processing method. When the distance between the mobile object and the route is large (greater than a predetermined value), the estimation result of the position and the orientation of the mobile object is corrected using the second processing result. In the present embodiment, the position/orientation of the mobile object 11 is determined using the first processing result obtained by inputting first measurement information obtained by the depth sensor and the image capturing apparatus installed on the mobile object, together with the map-related information, into the first processing method. Furthermore, a determination is made from the second processing result as to whether the determined position is on the route. When the position of the mobile object 11 is not on the route, the second processing result is used to the estimation result of the position and the orientation of the mobile object is corrected using the second processing result. Furthermore, a notification is issued to a user to notify that the mobile object 11 deviates from the correct running route. Alternatively, an attempt may be made to return the mobile object 11 to the correct route by using the position/orientation information.

(Description of Configuration)

The system configuration in the present embodiment is the same as that in Embodiment 1 described above with reference to FIG. 1 and FIG. 2. However, functions of some parts are different from those in Embodiment 1. In the present embodiment, only parts different in function from those in Embodiment 1 are described, but the other parts which are the same in function as those in FIG. 1 or FIG. 2 are not described again.

The position/orientation determination unit 1115 determines the position/orientation of the mobile object 11 using first measurement information and a first processing result based on the first processing method. Alternatively, a second processing result may be acquired from the second position/orientation estimation processing unit 143, and the position/orientation of the mobile object 11 may be determined. Alternatively, the first processing result based on the first measurement information and the first processing method described in Embodiment 1, and the second processing result based on the second measurement and the second processing method are integrated, and the result is stored as the position/orientation information of the mobile object 11. Then, the second processing result or position/orientation information is compared with the map-related information (the route) sent from the map-related information management unit 1112, and it is determined whether or not the mobile object 11 is on the route. Here, an example is described in which the first processing result is used as the position/orientation information in the movement control, and the second processing result is used for determining whether the mobile object 11 is on the route. In a concrete comparison method, a calculation is made to determine whether the position coordinates of the mobile object 11 in the world coordinate system identified from the second processing result are located in an area indicating the route. Alternatively, when the distance between an arbitrary point included in the area representing the route and the position coordinates of the mobile object 11 is equal to or smaller than a predetermined value (for example, 1 m), it is determined that the mobile object 11 is on the route. When the mobile object 11 is on the route, the position/orientation information is sent to the movement control unit 1116 as the position/orientation information of the mobile object 11. However, when the position/orientation information is not on the route, that is, when the position/orientation information is apart from the route by a predetermined distance or more (for example, 1 m or more), it is determined that the mobile object 11 deviates from the correct route along which the mobile object 11 is supposed to travel. In this case, the position/orientation determination unit 1115 corrects the estimation result of the position and the orientation of the mobile object using the second processing result. The position/orientation determination unit 1115 sends a notification to the mobile object management display unit 132 or the monitoring camera management display unit 142 to notify that the mobile object 11 deviated from the route, and issues a recovery instruction to prompt a user to perform an operation for returning the mobile object 11 to the route. In this process, the position at which and the time when the deviation from the route occurs are estimated from the position/orientation information of the mobile object 11, the first measurement information, the second measurement information, the Wi-Fi communication information, and the like. Then, an instruction may be issued to display the position and time where/when the mobile object 11 deviated from the route in a manner superimposed on the environment map. Furthermore, the position/orientation determination unit 1115 compares the first processing result with the second processing result. There is a possibility that a significant difference exists between the first and second processing results, or the degree of confidence of the first and/or second processing result is smaller than a predetermined value. In such a case, an instruction is given to the mobile object management display unit 132 or the monitoring camera management display unit 142 to notify a user that either the first processing result or the second processing result is abnormal.

The movement control unit 1116 uses the position/orientation information on the mobile object 11 sent from the position/orientation determination unit 1115, the map-related information sent from the map-related information management unit 1112 (a map including the destination and an area surrounding the mobile body 11). Then, a return route for returning to the correct route is searched for, and movement control for the returning is performed.

Based on the instruction from the position/orientation determination unit 1115, the mobile object management display unit 132 displays a notification indicating that the current moving path of the mobile object 11 deviates from the correct route, a recovery instruction, the position and the time where/when the mobile object 11 deviated from the correct route, and the like. The recovery instruction displayed on the mobile object management display unit 132 is for prompting a user, who is viewing the mobile object management display unit 132, to drive (by performing remote operation control or issuing a stop instruction) the mobile object 11 so as to return to the correct route.

Based on the instruction from the position/orientation determination unit 1115, the monitoring camera management display unit 142 displays a notification indicating that the current moving path of the mobile object 11 deviates from the correct route, a recovery instruction, the position and the time where/when the mobile object 11 deviated from the correct route, and the like. The recovery instruction displayed on the monitoring camera management display unit 142 is for prompting a user, who is viewing the monitoring camera management display unit 142, to drive (by performing remote operation control) the mobile object 11 so as to return to the correct route.

Figure 11:
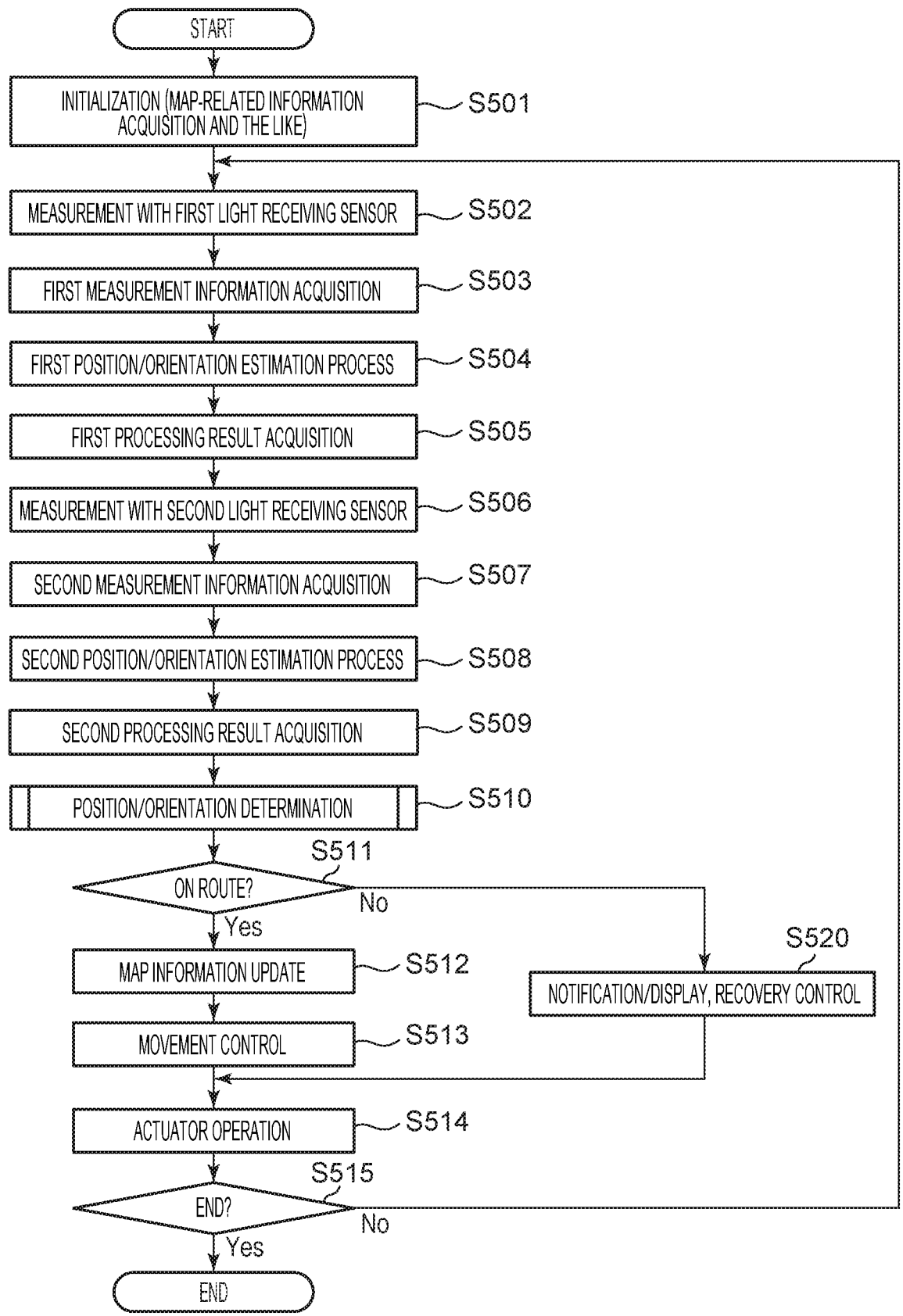
FIG. 11 is a flowchart illustrating a processing procedure performed by an information processing system.

FIG. 11 illustrates a processing procedure, relating to the operation of a mobile object called a transport vehicle (AGV), performed by the information processing apparatus according to the present embodiment. In the present embodiment, only processes of the procedure different from those in Embodiment 1 are described, and the other processes, which are performed in the same manner as shown in FIG. 5, are not be described.

S501 to S509 correspond to S201 to S209 in FIG. 5, and they are processed in a similar manner.

In S510, the position/orientation determination unit 1115 determines the position/orientation of the mobile object 11 using the first measurement information and the first processing result based on the first processing method. Here, the estimation result of the position and the orientation of the mobile object 11 is acquired using SLAM as in Embodiment 1. Furthermore, the position/orientation determination unit 1115 acquires a second processing result given as a result of estimating the position/orientation of the mobile object 11 from the image of the monitoring camera.

In S511, the position/orientation determination unit 1115 determines whether the mobile object 11 is on the route based on the second processing result and the map-related information (the route) sent from the map-related information management unit 1112. An example of a determination method is as follows. When the minimum distance between the second processing result at time t (world coordinates of the mobile object 11) and an arbitrary point on the route of the mobile object 11 is less than 1 m, it is determined that the mobile object 11 is on the route. If Yes, the process proceeds to S512. If No, the process proceeds to S520. In a case where it is determined that the mobile object 11 is not on the route, the position/orientation determination unit 1115 corrects the position/orientation information using the second processing result.

In S520, the position/orientation determination unit 1115 sends a notification to the mobile object management display unit 132 or the monitoring camera management display unit 142 to notify that the mobile object 11 is not on the route. Furthermore, the position/orientation determination unit 1115 instructs the mobile object management display unit 132 or the monitoring camera management display unit 142 to notify a user that the mobile object 11 is not on the route. Alternatively, a recovery instruction may be displayed to prompt a user to issue an instruction to return the mobile object 11 to the route. Alternatively, a notification/display instruction may be issued to estimate the position or the time where/when the mobile object 11 deviated from the route and display the estimated position or time so as to be superimposed on the map of the environment. Alternatively, using the position/orientation information on the mobile object 11 sent from the position/orientation determination unit 1115, the map-related information sent from the map-related information management unit 1112 (a map including the destination and an area surrounding the mobile body 11), the movement control unit 1116 may search for a return route for returning to the correct route, and may perform movement control for the returning.

S512 to S515 correspond to S211 to S214 in FIG. 5, and they are processed in a similar manner. In S510, the position/orientation determination unit 1115 may determine position/orientation information by integrating the first processing result and the second processing result. In this case, the position/orientation information determined in S510 is used in the determination made in S511 as to where the mobile object 11 is on the route.

Modification 4-1

In the present embodiment, the mobile object management display unit 132 and the monitoring camera management display unit 142 are not limited to fixed display screens. For example, it may be a handy terminal owned by a user who performs management work in a factory or a warehouse. By displaying a notification or the like on the handy terminal, it becomes possible for the user to immediately go to a site and to perform a returning operation, which provides an improved convenience.

Furthermore, in the present embodiment, when the mobile object 11 deviates from the route, a lamp (not shown) provided on the mobile object 11 may be turned on to notify that the mobile object 11 deviates from the route. Alternatively, an alarm sound may be emitted.

Furthermore, in the present embodiment, the position/orientation information of the mobile object 11, the first measurement information, the movement control sensor information, and the like may be stored such that the user can view them later. This makes it possible for the user to check the situation later, which provides an improved convenience.

Modification 4-2

In the present embodiment, when the movement control unit 1116 performs control for returning the mobile object 11, the movement control unit 1116 may control the mobile object 11 to reversely move along a route taken until then until the mobile object 11 reaches the correct route. Furthermore, in the present embodiment, the reason why the deviation from the route occurred may be analyzed, a countermeasure may be proposed or displayed.

Furthermore, in the present embodiment, the movement control unit 1116 may issue, via the mobile object management system 13, an instruction to reduce the moving speed of another mobile object 11 located near the mobile object 11 that deviated from the route or an instruction to temporarily stop the movement thereof. By reducing the moving speed of another mobile object 11 existing in the surroundings, it becomes possible to easily perform the return control on the mobile object 11 deviating from the route.

Embodiment 5

In Embodiment 5 described below, when the first processing result and the second processing result are inconsistent with each other, the user is notified that an abnormality has occurred somewhere in the information processing system 1, or the mobile object performs a recovery control operation. In this case, it is determined that one of the position/orientation information is erroneously estimated, and the system malfunction is likely to occur. System malfunction refers to unexpected mechanical failure or system trouble. System malfunctions should be detected and corrected early. There are two major causes of system malfunctions. One is that originating from a sensor installed on the mobile object 11, and the other one is that originating from the monitoring camera management system 14. A system malfunction of the former type may occur, for example, when there is an obstacle in a visual axis direction of the depth sensor 112 or the image capturing apparatus 113 and a field of view is partially blocked and thus the environment cannot be properly measured, or the depth sensor 112 or the image capturing apparatus 113 has a failure. A system malfunction of the former type may occur, for example, when the monitoring camera management system 14 cannot properly communicate with the mobile object 11, or when the monitoring camera management system 14 or the monitoring camera 15 has a failure.

(Description of Configuration)

The system configuration in the present embodiment is the same as that in Embodiment 1 described above with reference to FIG. 1 and FIG. 2. However, functions of some parts are different from those in Embodiment 1. In the present embodiment, only parts different in function from Embodiment 1 are described, but the other parts which are the same in function as those in FIG. 1 or 2 are not described again.

The position/orientation determination unit 1115 determines the position/orientation information of the mobile object 11 by integrating the first processing result based on the first measurement information and the first processing method, and the second processing result based on the second measurement information and the second processing method as described in Embodiment 1. At the same time, the first processing result based on the first measurement information and the first processing method and the second processing result based on the second processing method are respectively held, and it is determined whether they match. In the determining of whether or not they are consistent, when the difference (the distance) between the coordinates indicating the respective positions estimated from the first processing result and the second processing result is smaller than a predetermined value (for example, less than 1 m), it is determined that they are consistent. In a case where it is determined that they are consistent, the integrated position/orientation information is sent to the movement control unit 1116. However, in a case where it is determined that they are inconsistent, that is, in a case where the difference (the distance) between the first processing result and the second processing result is larger than the predetermined value (for example, 1 m or more or 90 degrees or more). In that case, it is highly possible that either the first processing result or the second processing result is erroneously estimated due to a system malfunction. Then, the position/orientation determination unit 1115 issues a notification/instruction, relating to the occurrence of the system malfunction, to the movement control unit 1116, the mobile object management display unit 132, and the monitoring camera management display unit 142. In a case where it is estimated that a system malfunction has occurred, the position/orientation determination unit 1115 instructs the mobile object management display unit 132 and the monitoring camera management display unit 142 to display information to notify a user of the system malfunction. In this case, an instruction may be issued to stop the information processing system 1 and/or the mobile object 11. Alternatively, in a case where the system malfunction originates from the monitoring camera management system 14, the first processing result may be sent to the movement control unit 1116 and the system operation may be continued. For example, when the first processing result has a large error or the degree of confidence thereof is low, the mobile object 11 is likely to have a failure. In this case, it is not necessary to stop the entire system, and the user may be notified of an abnormality of the specific mobile object 11 or a recovery instruction is given to deal with the failure of the sensor or the like of the mobile object 11. If the error in the second processing result is large or the degree of confidence thereof is low, it is possible that the monitoring camera has failed. In this case, the user is informed of the abnormality of the monitoring camera or is instructed to perform a recovery operation so as to partially cancel the position estimation processing by the monitoring camera. In a case where both processing results are incorrect, or where the degree of confidence of each result is lower than the predetermined value, there is a possibility that an error occur in the entire system. Therefore, the user is notified of the abnormality or is instructed to stop the entire system once.

The movement control unit 1116 performs recovery control using the position/orientation information on the mobile object 11 sent from the position/orientation determination unit 1115 and the map-related information sent from the map-related information management unit 1112 (a map including the destination and an area surrounding the mobile body 11).

The mobile object management display unit 132 displays a notification that the system has a malfunction based on the instruction from the position/orientation determination unit 1115. The notification displayed on the mobile object management display unit 132 is a recovery instruction to prompt the user, who is watching the mobile object management display unit 132, to restore the system.

The monitoring camera management display unit 142 displays a notification that the system has the malfunction based on the instruction from the position/orientation determination unit 1115. The recovery instruction is an instruction to prompt the user watching the monitoring camera management display unit 142 to restore the system.

Figure 12:
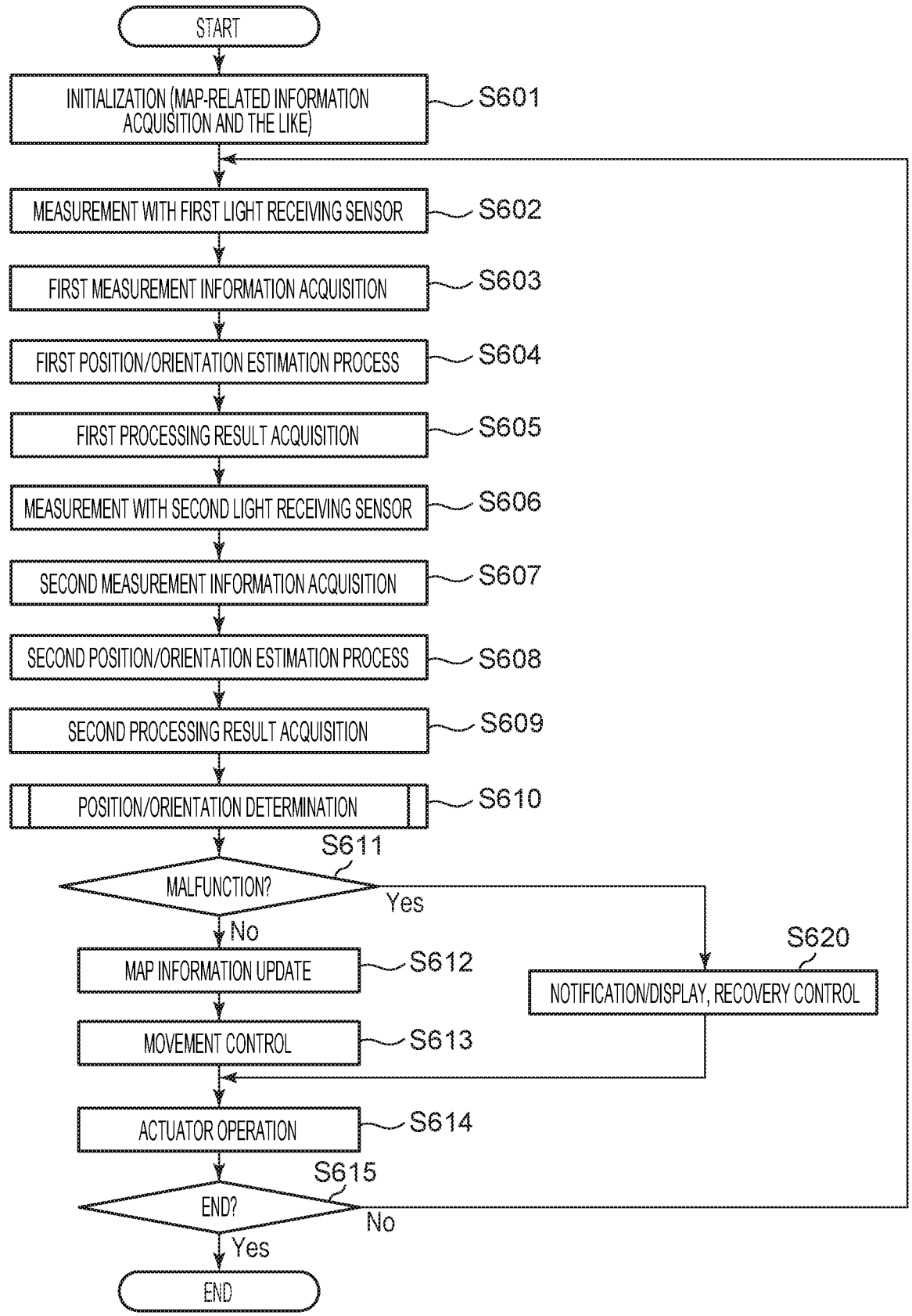
FIG. 12 is a flowchart illustrating a processing procedure performed by an information processing system.

FIG. 12 illustrates a processing procedure, relating to the operation of a mobile object called a transport vehicle (AGV), performed by the information processing system according to the present embodiment. In the present embodiment, only part of the procedure different from that in Embodiment 1 will be described, and the same part of the procedure as that shown in FIG. 3 will not be described. S601 to S610 correspond to S201 to S210 in FIG. 5, and they are processed in a similar manner.

In S611, the position/orientation determination unit 1115 performs a calculation for determining whether or not the system has a malfunction. For example, it is compared whether the first processing result and the second processing result match. When the distance between the position coordinates of the mobile object 11 given by the first processing result and the position coordinates of the mobile object 11 given by the second processing result is equal to or greater than a predetermined value (for example, 1 m), it is determined that there is a malfunction. Alternatively, when the angle formed by the orientation coordinate of the mobile object 11 given by the first processing result and the orientation coordinate of the mobile object 11 given by the second processing result are different by 90 degrees or more, it is determined that there is a malfunction. In the case of Yes (there is a malfunction=there is inconsistency), the process proceeds to S620. In the case of No (there is no malfunction=there is consistency), the process proceeds to S612.

In S620, the position/orientation determination unit 1115 instructs the mobile object management display unit 132 or the monitoring camera management display unit 142 to display a notification indicating that the system has a malfunction or indicating a cause of the system malfunction (the battery of the mobile object 11 is dead, etc.). According to the instruction, the mobile object management display unit 132 and the monitoring camera management display unit 142 display the specified contents. The user can see the display of the notification to know that the functional failure has occurred, and can know the cause of the functional failure. Alternatively, the movement control unit 1116 may perform control to restore the mobile object 11 using the position/orientation information on the mobile object 11 sent from the position/orientation determination unit 1115 and the map-related information sent from the map-related information management unit 1112.

S612 to S615 correspond to S211 to S214 in FIG. 5, and they are processed in a similar manner.

Modification 5-1

In the present embodiment, when the first processing result is not calculated correctly, there is a possibility that the battery (not shown) of the mobile object 11 has run out. In that case, the user may be notified that the battery is dead. In this case, the movement control unit 1116 instructs the mobile object management display unit 132 or the monitoring camera management display unit 142 to display the position information of the mobile object 11 whose battery has run out so as to be superimposed on the map of the environment.

Modification 5-2

In the present embodiment, the position/orientation determination unit 1115 may acquire the degree of confidence of the processing result by each processing method, compare the degree of confidence, and determine whether or not the processing results are consistent. In this case, the position/orientation determination unit 1115 acquires the first degree of confidence of the first processing result from the first position/orientation estimation processing unit 1113 and acquires the second degree of confidence of the second processing result from the second position/orientation estimation processing unit 143. By comparing the first degree of confidence and the second degree of confidence, it is possible to estimate whether the system malfunction originates from the sensor installed on the mobile object 11 or originates from the monitoring camera management system 14. That is, it is estimated that the one with a lower degree of confidence is involved in the malfunction. Examples of degrees of confidence relating to sensors includes an estimated degree of confidence of distance information provided by the sensor, and a degree of confidence that can be calculated from a matching error between frames. On the other hand, the degree of confidence relating to the monitoring camera management system 14 is given, for example, by the degree of confidence of recognition based on the monitoring camera image. Note that the degree of confidence may be determined based on a predetermined plurality of frames or based on a single frame. By notifying the user of the cause of the system malfunction and its origin, it becomes easier for the user to perform the recovery work, and the convenience is improved.

Embodiment 6

In Embodiment 6, the invention is applied to movement control on a mobile object.

If a load falls from an AGV onto a route, another AGV may be stopped, which may cause a production to be stopped. Furthermore, there is a risk that falling of an object from an AGV may cause a person to fall. Therefore, to achieve a stable operation of AGV and to achieve safety, it is important to detect falling of an object such as a load from an AGV at an early stage. In the present embodiment, the movement control of the mobile object 11 is performed using the position/orientation information (the first position/orientation information) estimated from the sensor information provided by the sensor installed on the mobile object 11 and the map-related information. If position/orientation information (object position/orientation information) of an object, which is obtained as a result of recognizing based on a monitoring camera image captured by the monitoring camera 15, indicates that the object is not located on the mobile object 11 although it should be located on the mobile object 11, it is estimated that a load has fallen from the mobile object 11. Thus, a user is notified of this fact, and is instructed to perform a recovery operation. On the other hand, in a case where the position/orientation information of the object (object position/orientation information) indicates that the object is located on the route of the mobile object 11, the object may interfere with the movement of the mobile object 11, and thus the user is notified of this fact and instructed to perform a recovery operation. Alternatively, the route may be changed such that the mobile object 11 avoids the object. Hereinafter, an object refers to a stationary object including a load.

(Description of Configuration)

Figure 14:
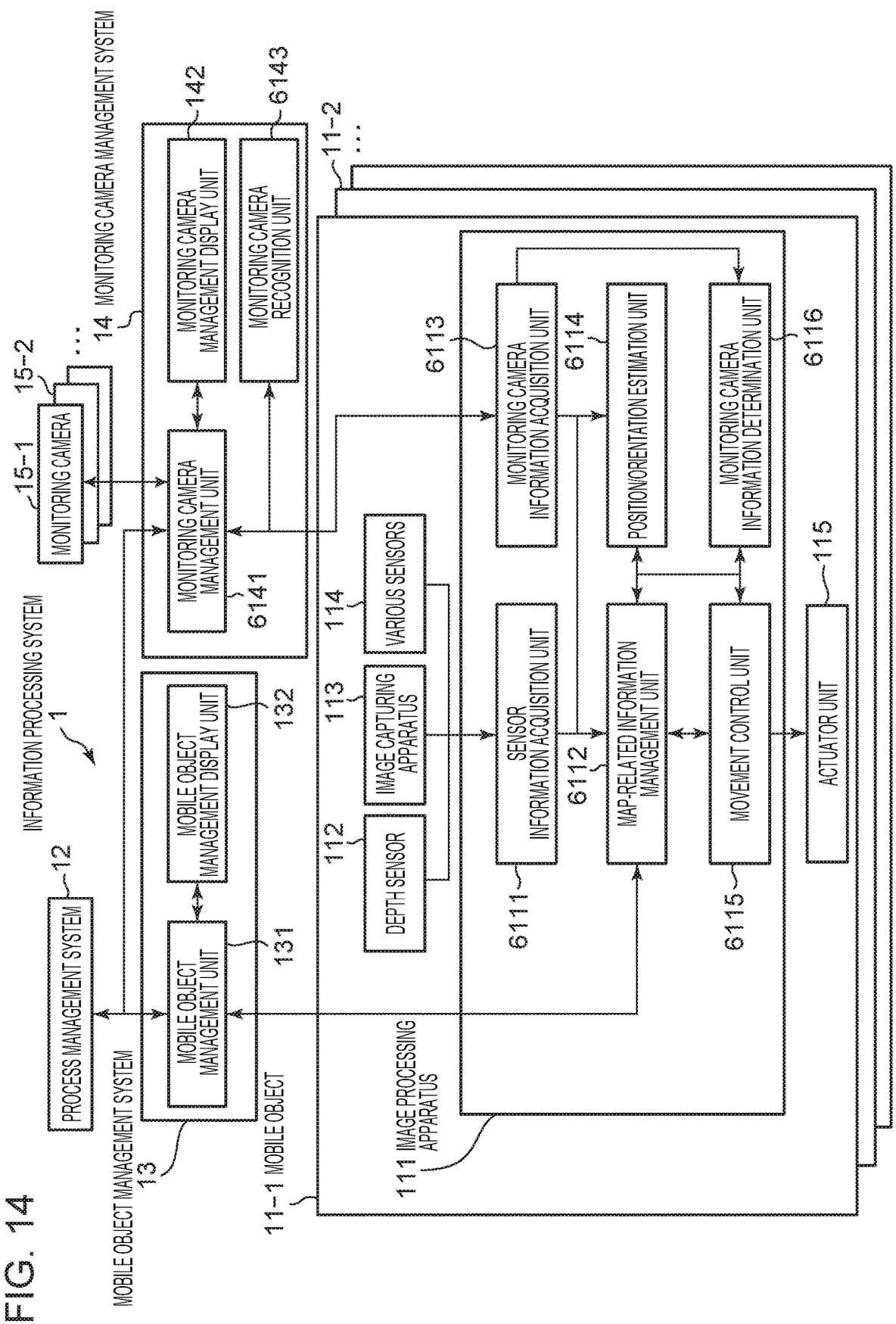
FIG. 14 is a block diagram illustrating a functional configuration of an information processing system.

FIG. 14 illustrates a configuration of a system in which the present embodiment is applied to a mobile object called a transport vehicle (AGV). Many parts are similar to those according to Embodiment 1 described above with reference to FIGS. 1 and 2. However, functions of some parts are different from those in Embodiment 1. In the present embodiment, only parts different in function from Embodiment 1 are described, but the other parts which are the same in function as those in FIG. 1 or 2 are not described again.

The sensor information acquisition unit 6111 acquires sensor information from the depth sensor 112 and the image capturing apparatus 113. The sensor information acquisition unit 6111 sends the sensor information to the map-related information management unit 6112 and the position/orientation estimation unit 6114. The sensor information refers to the distance information (point cloud data or a depth map) provided by the depth sensor and the image information provided by the image sensor. The sensor information acquisition unit 6111 acquires movement control sensor information necessary for movement control from the various sensors 114. The movement control sensor information includes odometry information provided by an odometry sensor, angular velocity information provided by an angular velocity sensor, and acceleration information provided by an acceleration sensor. The sensor information acquisition unit 6111 sends the movement control sensor information to the movement control unit 6115.

The map-related information management unit 6112 sends the map-related information, in addition to the position/orientation estimation unit 6114 and the movement control unit 6115, to the monitoring camera information determination unit 6116. When the monitoring camera information determination unit 6116 determines that a problem related to an object has occurred, the map-related information management unit 6112 alters the map-related information (the route). The altering of the route is performed such that a route that provides as short a moving distance as possible is selected from those that avoid the object. The altered route is sent to the movement control unit 6115 and used for movement control on the mobile object 11.

The monitoring camera information acquisition unit 6113 acquires monitoring camera information from the monitoring camera management unit 6141. The monitoring camera information acquisition unit 6113 sends the monitoring camera information to the monitoring camera information determination unit 6116 in addition to the map-related information management unit 6112 and the position/orientation estimation unit 6114. In the present embodiment, the monitoring camera information refers to information obtained as a result of recognition of the environment by the monitoring camera recognition unit 6143 in the monitoring camera management system 14, a monitoring camera image, or the like (for example, the position/orientation of, the type of, and the number of objects, persons, mobile objects, etc. existing in the environment).

The position/orientation estimation unit 6114 sends the position/orientation information of the mobile object 11 to the monitoring camera information determination unit 6116 in addition to the map-related information management unit 6112 and the movement control unit 6115. The position/orientation estimation unit 6114 acquires the sensor information sent from the sensor information acquisition unit 6111, the map-related information sent from the map-related information management unit 6112, and the monitoring camera information sent from the monitoring camera information acquisition unit 6113. The position/orientation information of the mobile object 11 is estimated using a predetermined processing method. In the present embodiment, SLAM is used as the predetermined first estimation method. In the present embodiment, the predetermined second estimation method is a processing method for converting the position/orientation estimation result of the mobile object 11 using the monitoring camera information. The position/orientation estimation unit 6114 sends the position/orientation information to the map-related information management unit 6112 and the movement control unit 6115. In the present embodiment, the position/orientation or the position/orientation information is represented by 6-degree-of-freedom position/orientation parameters given by a combination of a 3-degree-of-freedom parameters (X, Y, Z) indicating the position of the mobile object 11 on the world coordinate system in the environment and a 3-degree-of-freedom parameters (Roll, Pitch, Yaw) indicating the orientation.

The movement control unit 6115 acquires the movement control sensor information sent from the sensor information acquisition unit 6111, the map-related information sent from the map-related information management unit 6112, and the position/orientation information of the mobile object 11 sent from the position/orientation estimation unit 6114. Then, the movement control information of the mobile object 11 is generated. The movement control unit 6115 sends the movement control information to the actuator unit 115. Furthermore, the movement control unit 6115 may generate and send information for a moving direction indication unit (not shown) to indicate a moving direction such as a turn signal based on the route. In the present embodiment, the movement control information includes the rotation torque of the wheels of the mobile object 11, the moving direction, the brake, and the like.

The monitoring camera information determination unit 6116 performs estimation by performing coordinate transformation of position/orientation information (object position/orientation information) of an object existing in the environment on the world coordinate system based on the monitoring camera information sent from the monitoring camera information acquisition unit 6113. Furthermore, the monitoring camera information determination unit 6116 determines whether an object exists at a proper position in the environment, based on the map information sent from the map-related information management unit 6112 and the position/orientation information of the mobile object 11 sent from the position/orientation estimation unit 6114. That is, it is determined whether or not an obstacle related to the object has occurred. For example, in a case where a load supposed to be transported by the mobile object 11 is not on the mobile object 11, there is a possibility that the load was dropped onto the route during the transport or the load was not loaded due to a work error. Therefore, a notification is sent to the mobile object management display unit 132 or the monitoring camera management display unit 142 to notify that there is a possibility that an object-related problem, such as dropping of an object (a load) onto the route, has occurred, and an instruction is issued to properly return the object (the load. Hereinafter, the object mainly refers to the load of the mobile object 11. The monitoring camera information determination unit 6116 may be disposed at a location other than the location shown in the figure, such as a location in the monitoring camera management system 14, or the monitoring camera information determination unit 6116 may be disposed in another system such as the mobile object management system 13. In a case where it is determined that the object is on the route of the mobile object 11, the object may interfere with the movement of the mobile object 11. Therefore, the monitoring camera information determination unit 6116 sends, to the mobile object management display unit 132 or the monitoring camera management display unit 142, a notification indicating that there is an object-related problem such as lying of the object on the route, and issues an instruct to remove the object.

Based on the instruction from the monitoring camera information determination unit 6116, the mobile object management display unit 132 displays the notification regarding the object-related problem and the recovery instruction. The notification and the instruction displayed on the mobile object management display unit 132 are for prompting the user, who is watching the mobile object management display unit 132, to take an action to solve the object-related problem.

The monitoring camera management display unit 142 displays the notification regarding the object-related problem and the recovery instruction based on the instruction from the monitoring camera information determination unit 6116. The notification and the instruction displayed on the monitoring camera management display unit 142 are for prompting the user, who is watching the monitoring camera management display unit 142, to take an action to solve the object-related problem.

The monitoring camera management unit 6141 sends the monitoring camera image captured by the monitoring camera 15 to the monitoring camera recognition unit 6143. Furthermore, it is also sent, as monitoring camera information, to the monitoring camera information acquisition unit 6113. The monitoring camera information includes the second processing result sent from the monitoring camera recognition unit 6143 (the position/orientation estimation processing result of the mobile object 11 and the degree of confidence of the result of recognition made by the second processing method or the recognition result of the object detection) or the monitoring camera image. Furthermore, the monitoring camera management unit 6141 communicates with the monitoring camera 15 to receive a monitoring camera image or transmit/receive various kinds of information for controlling the monitoring camera 15 (for example, pan/tilt/zoom control, on/off control). The monitoring camera management unit 6141 communicates with the process management system 12 to transmit/receive information indicating a content of an operation of each mobile object 11 (an instruction indicating what is to be transported) and various kinds of information such as information indicating a work place (a map, coordinate information, etc.). The monitoring camera management unit 6141 holds the monitoring camera images captured by the monitoring cameras 15 such that the monitoring camera images are managed in time series for each monitoring camera.

The monitoring camera recognition unit 6143 extracts feature points from the monitoring camera image captured by the monitoring camera 15 and recognizes the positions/orientations, types, and numbers of objects such as loads, people, and mobile objects existing in the environment. As a method of detecting feature points, it is known to detect points having a characteristic shape such as a corner or an edge of an object. Detected features are called key points.

For example, in order for the monitoring camera 15 to perform object detection to detect the mobile object 11 from an image, the feature points (the key points) of the marker attached to the mobile object 11 are extracted from the frames acquired at certain fixed intervals, and the feature points are extracted in each of successive frames. This makes it possible to track the mobile object 11. The position/orientation of the mobile object 11 is estimated from the image coordinates of the feature points. In the present embodiment, the monitoring camera recognition unit 6143 estimates the position/orientation of the object by performing coordinate transformation on the world coordinate system based on the recognition result of the object and the position/orientation information of each monitoring camera 15. There are various methods of recognizing the environment. Example include a template matching method, a geometric model fitting method, a machine learning method, a deep learning method, and a reinforcement learning method. In order to improve the recognition accuracy, the template, the geometric model, the recognition dictionary, the learning model, and the reward model may be prepared in advance, or may be generated online while the information processing system 1 is in operation. By recognizing IDs from the markers attached to the respective mobile objects 11, it is possible to recognize not only the position/orientation of each mobile object 11, but also recognize the types of individual mobile objects 11 (IDs) and the number of the mobile objects 11.

Figure 15:
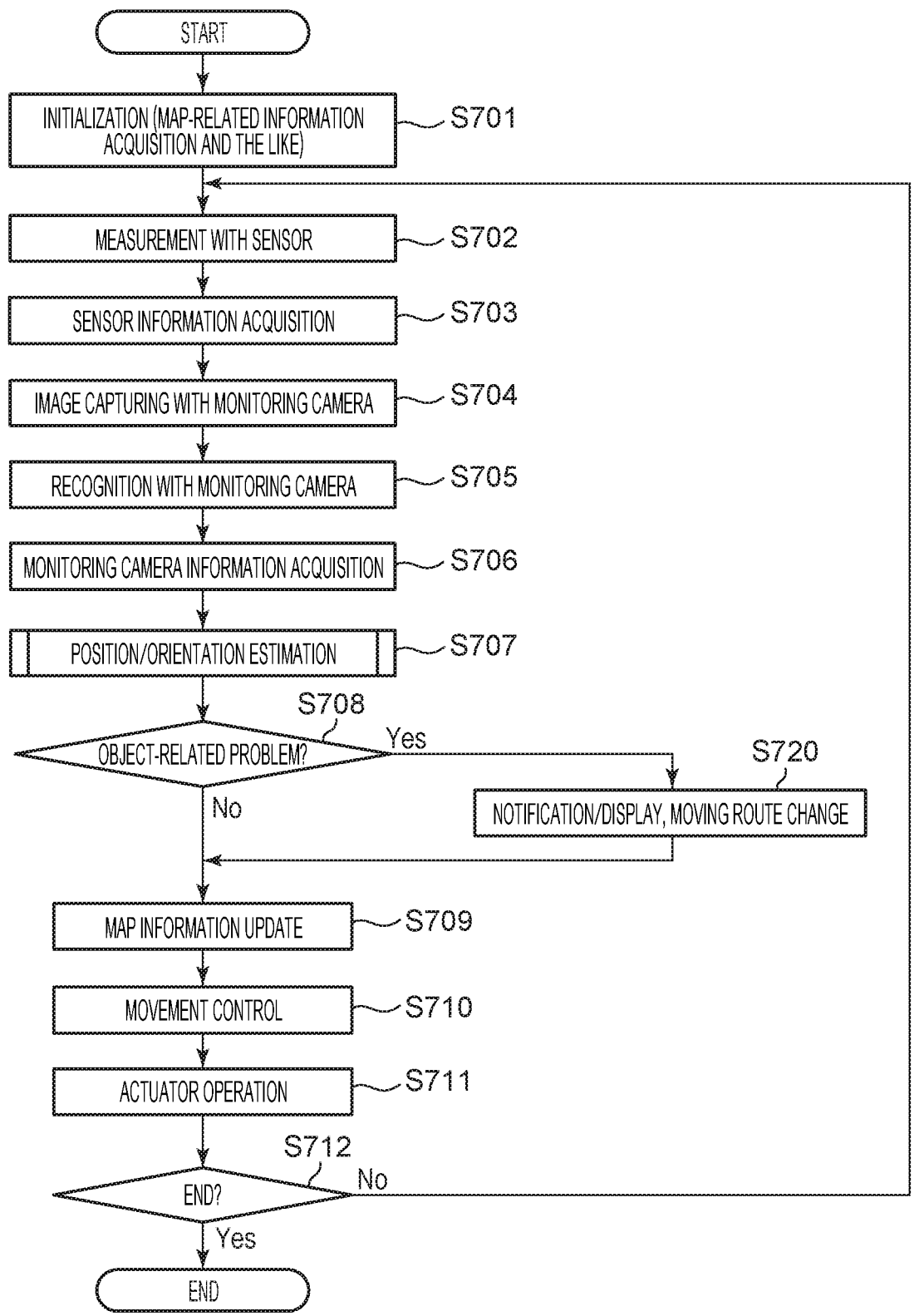
FIG. 15 is a flowchart illustrating a processing procedure performed by an information processing system.

FIG. 15 illustrates a processing procedure, relating to the operation of a mobile object called a transport vehicle (AGV), performed by the information processing system according to the present embodiment. In the following description, each process (step) will be denoted by a process number with a prefix of S which stands for a step. However, the information processing apparatus 111 does not necessarily need to perform all steps described in the flowchart.

In S701, the information processing apparatus 111 performs initialization processing in which map-related information (a map, a route, a target point, etc.) held by the mobile object management unit 131 is stored into the map-related information management unit 6112. Furthermore, the information processing apparatus 111 acquires initial setting values of the depth sensor 112, the sensor parameters of the image capturing apparatus 113, the camera parameters, the calibration parameters of the various sensors 114, and the parameters used in each functional configuration. The timing of starting the initialization process may be when a user activates the information processing system 1, the mobile object management system 13, or the mobile object 11.

In S702, the depth sensor 112 measures the distance of the environment around the mobile object 11, and the image capturing apparatus 113 captures an image of the environment around the mobile object 11, and the various sensors 114 measure movement control sensor information.

In S703, the sensor information acquisition unit 6111 acquires sensor information from the depth sensor 112 and the image capturing apparatus 113. The sensor information refers to the distance information (point cloud data or a depth map) provided by the depth sensor and the image information provided by the image sensor. The sensor information acquisition unit 6111 acquires movement control sensor information necessary for movement control from the various sensors 114.

In S704, the monitoring camera 15 captures an image of the surrounding environment. The monitoring camera 15 sends the captured image to the monitoring camera management unit 6141.

In S705, the monitoring camera recognition unit 6143 acquires monitoring camera information including the image captured in S704 by the monitoring camera 15 from the monitoring camera management unit 6141, and detects whether there is a dropped object in the environment. When an object is detected, the position/orientation of the object is estimated by performing a coordinate transformation on the world coordinate system based on the recognition result of the object and the position/orientation information of each monitoring camera 15.

In S706, the monitoring camera information acquisition unit 6113 acquires monitoring camera information from the monitoring camera management unit 6141.

In S707, the position/orientation estimation unit 6114 estimates the position/orientation information of the mobile object 11 by using the sensor information sent from the sensor information acquisition unit 6111 and the map-related information (a map) sent from the map-related information management unit 6112. Furthermore, the position/orientation estimation unit 6114 estimates the position/orientation information of the mobile object 11 by performing the coordinate transformation on the position/orientation information input as the monitoring camera information from the monitoring camera information acquisition unit 6113. Alternatively, the position/orientation estimation unit 6114 may input the monitoring camera image captured by the monitoring camera 15, and may estimate the position/orientation information of the mobile object 11 using the techniques described in the explanation of the monitoring camera recognition unit 6143, such as template matching, model fitting, and machine learning, to detect the mobile object 11.

In S708, the monitoring camera information determination unit 6116 determines whether an object that should be on the mobile object 11 is not on the mobile object 11 or whether there is an object on the route, that is, whether there is an object-related problem. Whether or not there is an object on the mobile object 11 is estimated by checking, using model information of the object, whether the object is located at a position where the mobile object 11 recognized by the monitoring camera recognition unit 6143 is located. The determination on whether or not there is an object on the route is made by determining whether or not an object recognized by the monitoring camera recognition unit 6143 is located on the route thereby impeding the running of the mobile object 11. In the case of No, the process proceeds to step S709. In the case of No, the process proceeds to step S720.

In S720, the monitoring camera information determination unit 6116 sends a notification to the mobile object management display unit 132 and the monitoring camera management display unit 142. This notification indicates, for example, that an object that should be on the mobile object 11 is not found there or there is an object on the route, that is, the notification indicates that there is an object-related problem. Furthermore, an instruction to resolve the object-related problem is issued. Furthermore, the monitoring camera management display unit 142 is instructed to display the position/orientation of the target mobile object 11 or object on the environment map. According to the instruction, the mobile object management display unit 132 and the monitoring camera management display unit 142 display the specified contents. Alternatively, the monitoring camera information determination unit 6116 may instruct the map-related information management unit 6112 to alter the map-related information (a route) so as to avoid the object. In accordance with the instruction, the map-related information management unit 6112 alters the route.

Note that S709 is performed only in the case where the position/orientation estimation unit 6114 uses SLAM as the processing method. In a case where the SLAM technology is not used, S709 is skipped. In S709, the map-related information management unit 6112 updates the map of the environment so as to optimize it based on the latest map-related information held in the map-related information management unit 6112 and the position/orientation information determined by the position/orientation estimation unit 6114. For example, in a case where point cloud is used in the map, the point cloud positions are altered by the optimization processing so as to match an actual environment scene. In a case where key frame data is used in the map, the key frame position/orientation is altered by the optimization processing so as to match an actual environment scene.

In S710, the movement control unit 6115 generates movement control information of the mobile object 11.

In S711, the actuator unit 115 controls a rotation torque, a moving direction, and a brake (acceleration) on wheels of the mobile object 11 by using the movement control information sent from the movement control unit 6115.

In S712, the information processing apparatus 111 determines whether the operation of the system is completed, that is whether the mobile object 11 has arrived at the target point or whether the user has issued an instruction to stop the system.

In the present embodiment, the movement control of the mobile object 11 is performed using the position/orientation information (the first position/orientation information) estimated from the sensor information provided by the sensor installed on the mobile object 11 and the map-related information. In a case where the position/orientation information (the object position/orientation information) of the object obtained as a result of recognizing the monitoring camera image captured by the monitoring camera 15 indicates that the object that should be on the mobile object 11 is not found on the mobile object 11, it is estimated that a load has been dropped from the mobile object 11 during the transportation thereof. In this case, a user is notified of the above fact, and is instructed to recover the situation. On the other hand, in a case where the position/orientation information of the object (the object position/orientation information) indicates that the object is located on the route, the object may interfere with the movement of the mobile object 11, and thus the user is notified of this fact and is instructed to recover the situation. Alternatively, the route may be changed such that the mobile object 11 avoids the object.

As described above, even if a load drops from the mobile object 11 during the transportation thereof, or even if there is an object on the route, it is possible to notify a user of the above fact or alter the route using the monitoring camera information. Thus, it is possible to achieve high-reliability movement control on the mobile object 11 with less effort and time.

Modification 6-1

In the present embodiment, an object or a load on the route may be removed by the movement of the mobile object 11. In a case where the mobile object 11 is equipped with a robot manipulator, the object may be picked up and placed at a place where the object should be located.

Modification 6-2

In the present embodiment, in a case where it is recognized that an object or a load exists in an area, the area may be excluded from being used in the position/orientation estimation of the mobile object 11 by sensors or from being used in the generation of the map of the environment.

Embodiment 7

Embodiment 7 described below discloses a technique in which the present invention is applied to movement control of a mobile object.

From the viewpoint of safety, the AGV is provided with a mechanism for preventing a collision using a depth sensor or the like. However, there is a possibility that a sensor has some abnormality or failure may cause the AGV to collide with a person. When a person passes across a route, if a person suddenly appears in a place that cannot be detected by the sensor provided on the AGV, the speed control cannot be performed to avoid the person, and thus the AGV may collide with the person. In order to cope with such a dangerous situation, in the present embodiment, the movement control of the mobile object 11 is performed using the position/orientation information (the first position/orientation information) estimated from the sensor information provided by the sensor disposed on the mobile object 11 and the map-related information. In a case where position/orientation information or position/orientation prediction information of a person obtained as a result of recognizing a monitoring camera image captured by the monitoring camera 15 indicates that the person is located on the route of the mobile object 11, the person may interfere with the movement of the mobile object 11, and thus the route of the mobile object 11 is altered. The position/orientation information of the person and the position/orientation prediction information of the person are generically referred to as person position/orientation information.

(Description of Configuration)

The system configuration in the present embodiment is the same as that in Embodiment 6 described above with reference to FIG. 14. However, functions of some parts are different from those in Embodiment 6. In the present embodiment, only parts different in function from Embodiment 6 are described, but the other parts which are the same in function as those in FIG. 14 are not described again.

The map-related information management unit 6112 sends the map-related information, in addition to the position/orientation estimation unit 6114 and the movement control unit 6115, to the monitoring camera information determination unit 6116. The map-related information management unit 6112 alters the map-related information (the route) when the monitoring camera information determination unit 6116 determines that a person is on the route of the mobile object 11. In the alteration of the routes, a route that provides as short a movement distance as possible is selected from routes that avoid a person. Alternatively, in the monitoring camera recognition unit 6143, the movement of the person may be predicted by deep learning or a simulator, and the route of the mobile object 11 may be altered so as not to hinder the future movement of the person. The movement of the person may be predicted by using a learning model learned in advance by observing movement of persons using deep learning, or may be predicted by a simulation based on the movement trajectories of persons in the past. The altered route is sent to the movement control unit 6115 and used for movement control on the mobile object 11.

The monitoring camera information determination unit 6116 performs the estimation by performing coordinate transformation on the world coordinate system on the position/orientation information of the person existing in the environment or the position/orientation prediction information of the person based on the monitoring camera information sent from the monitoring camera information acquisition unit 6113. The monitoring camera information determination unit 6116 also uses the map information sent from the map-related information management unit 6112 and the position/orientation information of the mobile object 11 sent from the position/orientation estimation unit 6114. Then, a determination is performed as to whether at least one person is presently on the route of the mobile object 11 or is likely to move to the route. In a case where a person is present on the route or is likely to move to the route, the person may hinder the movement of the mobile object 11, and thus the person position/orientation information is sent to the map-related information management unit 6112, and the map-related information (movement) is sent and an instruction is issued to alter the map-related information (the route).

Figure 16:
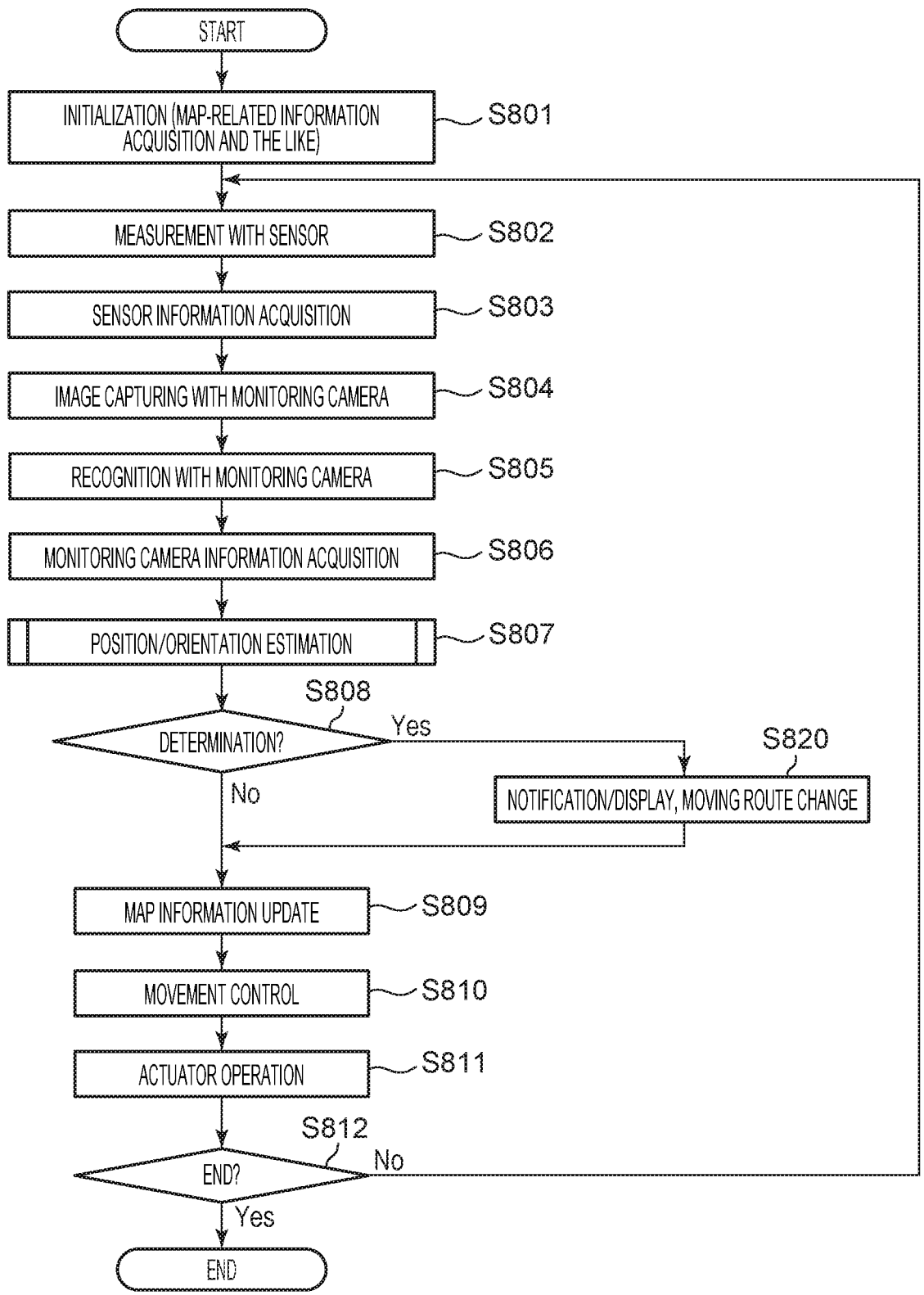
FIG. 16 is a flowchart illustrating a processing procedure performed by an information processing system.

FIG. 16 illustrates a processing procedure, relating to the operation of a mobile object called a transport vehicle (AGV), performed by the information processing apparatus according to the present embodiment. In the present embodiment, only processes of the procedure different from Embodiment 6 are described, but the other processes which are the same as those in FIG. 15 are not described again.

S801 to S807 are performed in a similar manner to S701 to S707 in Embodiment 6 in FIG. 15.

In S808, the monitoring camera information determination unit 6116 determines whether a person existing in the environment is on the route of the mobile object 11 or is likely to come onto the route. In the determination, if the deep learning or the simulator described above indicates that the predicted movement of the person is not hindered by the mobile object 11, then it is determined that the person is likely not to come onto the route. In the case of No, the process proceeds to S809. In the case of Yes, the process proceeds to S820.

In S820, the monitoring camera information determination unit 6116 instructs the map-related information management unit 6112 to alter the map-related information (the route) so as to avoid the person. In accordance with the instruction, the map-related information management unit 6112 alters the route. Alternatively, a notification and an instruction may be issued to display the position/orientation of the person of interest so as to be superimposed on the map of the environment. According to the notification/instruction, the mobile object management display unit 132 and the monitoring camera management display unit 142 display the specified content.

In the present embodiment, the movement control of the mobile object 11 is performed using the position/orientation information (the first position/orientation information) estimated from the sensor information provided by the sensor installed on the mobile object 11 and the map-related information. In a case where the position/orientation information of the person obtained as a result of recognizing the monitoring camera image captured by the monitoring camera 15 indicates that the person is on the route of the mobile object 11, the person may hinder the movement of the mobile object 11, and thus the route is changed. Thus, as described above, even in the case where a person is present on the route of the mobile object 11 or is likely to move onto the route, it is possible to change the route using the monitoring camera information. Thus, it is possible to achieve high-reliability movement control on the mobile object 11 with less effort and time.

Modification 7-1

In the present embodiment, in a case where it is recognized that a person exists in an area, the area may be excluded from being used in the position/orientation estimation of the mobile object 11 by sensors or from being used in the generation of the map of the environment. Furthermore, such an area may be excluded from being used in object recognition by the monitoring camera.

Embodiment 8

In Embodiment 8, the invention is applied to movement control on a mobile object.

In the present embodiment, the movement control of the mobile object 11 is performed using the position/orientation information (the first position/orientation information) estimated from the sensor information provided by the sensor installed on the mobile object 11 and the map-related information. In a case where position/orientation information or position/orientation prediction information of other one of mobile objects 11 obtained as a result of recognizing a monitoring camera image captured by the monitoring camera 15 indicates that the other one of mobile objects 11 is located on the route of a mobile object 11, the other one of mobile objects 11 may interfere with the movement of the mobile object 11, and thus the route is changed. The position/orientation information of the other one of mobile objects 11 and the position/orientation prediction information of the other one of mobile objects 11 are generically referred to as mobile object position/orientation information.

(Description of Configuration)

The system configuration in the present embodiment is the same as that in Embodiment 6 described above with reference to FIG. 14. However, functions of some parts are different from those in Embodiment 6. In the present embodiment, only parts different in function from Embodiment 6 are described, but the other parts which are the same in function as those in FIG. 14 are not described again.

The map-related information management unit 6112 sends the map-related information, in addition to the position/orientation estimation unit 6114 and the movement control unit 6115, to the monitoring camera information determination unit 6116. In a case where the monitoring camera information determination unit 6116 determines that the other one of mobile objects 11 is on the route of the mobile object 11, the map-related information management unit 6112 alters the map-related information (the route). The altering of the route is performed such that a route that provides as short a moving distance as possible is selected from those that avoid the other one of mobile objects 11. Alternatively, in the monitoring camera recognition unit 6143, the movement of the other one of mobile objects 11 may be predicted by deep learning or a simulator, and the route of the mobile object 11 may be altered so as not to hinder the future movement of the other one of mobile objects 11. Alternatively, the route may be altered by optimizing the movements of the plurality of mobile objects 11 by reinforcement learning. It is assumed that the reward model for reinforcement learning is created in advance by the user, and the optimization of the movement is performed by determining a maximum reward in the simulation. The reward is given such that when the distance from the other mobile objects is greater than a predetermined value, +1 is given as the reward periodically. When the distance from the other mobile objects becomes smaller than the predetermined value, −1 is given as the reward periodically. When the distance to the other one of mobile objects becomes very small or when a collision with a wall occurs and the movement stops, −100 is given as the reward. Alternatively, the reward may be set stepwise from −1 to −100 according to how close the mobile object is to one of other mobile objects or the wall. Alternatively, route information of other mobile objects 11 may be acquired from the position/orientation information of the mobile object 11 managed by the mobile object management unit 131, and the movement of other mobile objects 11 may be predicted based on the acquired route information and the route may be altered. The altered route is sent to the movement control unit 6115 and used for movement control on the mobile object 11. The monitoring camera information determination unit 6116 performs estimation such that position/orientation information of other one mobile object 11 existing in the environment or position/orientation prediction information of other one mobile object 11 is determined from monitoring camera information sent from the monitoring camera information acquisition unit 6113 and is coordinate-transformed on the world coordinate system. The monitoring camera information determination unit 6116 uses the map information sent from the map-related information management unit 6112 and the position/orientation information of the mobile object 11 sent from the position/orientation estimation unit 6113. Using these pieces of information, it is determined whether at least one or more other mobile objects 11 are on the route of the mobile object 11 or are likely to come onto the route. In a case where it is determined that at least one other mobile object 11 is present or is likely to come onto the route, the at least one other mobile object 11 may hinder the movement of the mobile object 11, and thus the mobile object position/orientation information is sent to the map-related information management unit 6112 and an instruction is given thereto to alter the map-related information (the route).

FIG. 16 illustrates a processing procedure, relating to the operation of a mobile object called a transport vehicle (AGV), performed by the information processing apparatus according to the present embodiment. In the present embodiment, only processes of the procedure different from Embodiment 7 are described, but the other processes which are the same as those in FIG. 15 are not described again.

In S808, the monitoring camera information determination unit 6116 determines whether other one mobile object 11 existing in the environment is on the route of the mobile object 11 or is likely to come onto the route. In the determination, if the deep learning or the simulator described above indicates that the predicted movement of other one mobile object 11 is not hindered by the mobile object 11 of interest, then it is determined that the other one mobile object 11 is likely not to come onto the route. In the case of No, the process proceeds to S809. In the case of Yes, the process proceeds to S820.

In S820, the monitoring camera information determination unit 6116 instructs the map-related information management unit 6112 to alter the map-related information (the route) so as to avoid the other one mobile object 11. In response, the map-related information management unit 6112 alters the route. Alternatively, a notification and an instruction are given to display the position/orientation of other one mobile object 11 so as to be superimposed on the map of the environment. According to the notification/instruction, the mobile object management display unit 132 and the monitoring camera management display unit 142 display the specified content.

In the present embodiment, the movement control of the mobile object 11 is performed using the position/orientation information (the first position/orientation information) estimated from the sensor information provided by the sensor installed on the mobile object 11 and the map-related information. In a case where mobile object position/orientation information of other one mobile object obtained as a result of recognizing a monitoring camera image captured by the monitoring camera 15 indicates that the other one mobile object is located on the route of the mobile object 11, the other one mobile object 11 may interfere with the movement of the mobile object 11 of interest, and thus the route is changed.

Thus, as described above, even in the case where the other one mobile object 11 is present on the route of the mobile object 11 of interest or is likely to move onto the route, it is possible to change the route using the monitoring camera information. Thus, it is possible to achieve high-reliability movement control on the mobile object 11 with less effort and time.

Modification 8-1

In the present embodiment, in a case where it is recognized that other one mobile object 11 is present in an area, the area may be excluded from being used in the position/orientation estimation of the mobile object 11 by sensors or from being used in the generation of the map of the environment. Furthermore, such an area may be excluded from being used in object recognition by the monitoring camera.

In an alternative embodiment, for example, in an area used by the mobile object 11 to charge a battery or used to park, a wall or other one or more mobile objects 11 exist around the mobile object 11 of interest, there is a possibility that the first position/orientation estimation using sensors cannot be performed correctly. In such a situation, the area in the environment may be set as an area in which the monitoring camera information is preferentially used. When the mobile object 11 is located in this area, the position/orientation information may be estimated such that a large weighting coefficient is applied to the processing result obtained via the processing method using the monitoring camera information. This makes it possible to achieve high-reliability acquisition of the position of the mobile object 11.

Other Modifications

In another embodiment, a throughput (a work volume) per unit time for tasks such as product assembly, product transportation, and the like executed in the information processing system 1 is maximized. In addition, reinforcement learning may be used to reduce costs in terms of moving distances, moving times, power consumption, wear of actuator, and the like for a plurality of mobile objects 11 as much as possible. The reward model for reinforcement learning is created in advance by the user, and the optimization of the throughput and the cost is performed such that the reward in the simulation is maximized.

Thus, the throughput and the cost of tasks in the information processing system 1 are optimized, and it becomes possible to achieve high-reliability movement control on the mobile object 11.

In another embodiment, the rotation torque of the wheels of the mobile object 11 may be changed depending on the weight of an object being transported. For example, a weighing sensor is provided as one of the various sensors 114 of the mobile object 11, the weight of an object being transported is measured by the weighing sensor. The movement control may be performed while increasing the rotation torque of the wheels by a predetermined amount as the weight of the object increases. Alternatively, the determining of the rotation torque may be learned by reinforcement learning or machine learning such that the moving speed of the mobile object 11 is maintained at a fixed value regardless of the weight of the object.

This makes it possible to avoid large fluctuation of the moving speed due to the weight of the object being transported by the mobile object 11, thereby achieving high-reliability movement control on the mobile object 11.

Figure 13:
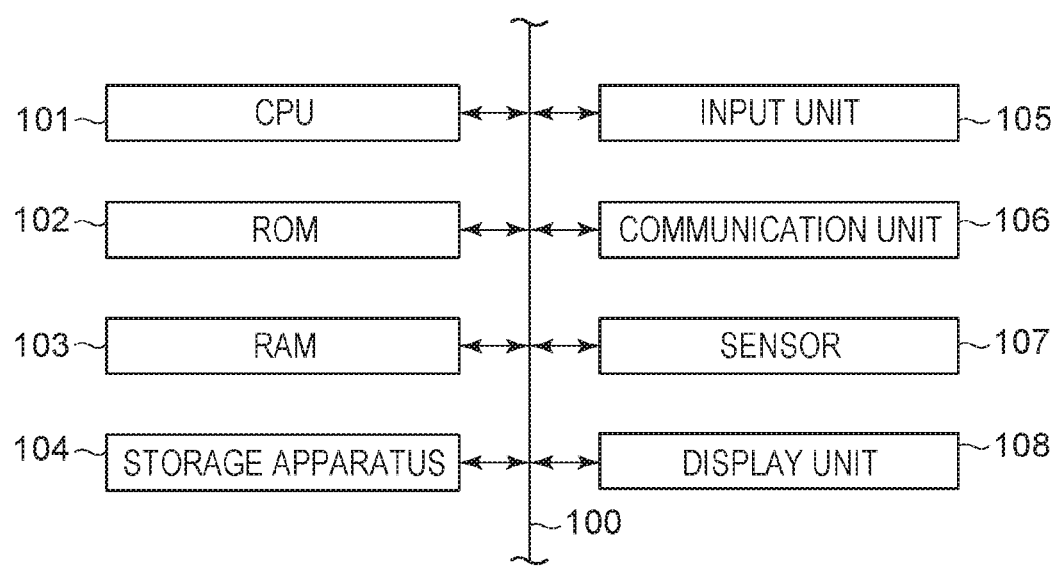
FIG. 13 is a block diagram illustrating a hardware configuration of an information processing apparatus.

The information processing apparatus 111 may be realized using, for example, an ordinary PC (personal computer), built-in hardware, or a PLC (Programmable Logic Controller) as shown in FIG. 13. 100 denotes a bus, 101 denotes a CPU, 102 denotes a ROM, 103 denotes a RAM, 104 is denotes a storage apparatus, 105 denotes an input unit, 106 denotes a communication unit, 107 denotes a sensor, and 108 denotes a display unit. For example, the map-related information management unit 1112 is configured using a storage medium such as a hard disk apparatus or a flash memory device. In this hard disk apparatus, a computer program and data are stored for use in execution by a PC, built-in hardware, or a CPU of PLC to realize various functions of parts in the information processing apparatus 111 other than the map-related information management unit 1112. The CPU may load the computer program and/or data stored in the hard disk apparatus or a flash memory device into a memory such as a RAM, and execute processing using the computer program and/or data. As a result, functions of the information processing apparatus 111 are realized by the PC, the built-in hardware, or the PLC.

The mobile object in the present invention may be any mobile object as long as it moves according to the movement control information. An example of such a mobile object is a transport vehicle (AGV (Automated Guided Vehicle)). Alternatively, it may be an autonomous vehicle or an autonomous mobile robot.

In the present invention, the sensor may be any sensor as long as it can measure the environment, the mobile object, and the like. Examples are a depth sensor, an image sensor, an odometry sensor, an angular velocity sensor, an acceleration sensor, and the like. Furthermore, the sensor information may be any information measured by the sensor. Examples are distance information (or three-dimensional information or depth information), image information, odometry (position/orientation information obtained from the rotation angle of the wheel), angular velocity, acceleration, and the like.

The monitoring camera in the present invention may be any camera as long as it monitors the environment, a mobile object, and the like.

The map in the present invention may be any map as long as it represents the structure and space of the environment. Examples are three-dimensional point cloud data (combined with color information), a set of key frame data, and a three-dimensional model of the environment. The key frame data is data obtained as follows. Depth information viewed from a certain point of view in the environment is quantized into color gradations. A depth map of such depth information is obtained at fixed intervals, and is combined with color information obtained from an image. Alternatively, the key frame data may be two-dimensional point cloud data (combined with color information) on a plane horizontally parallel to the environment floor or a two-dimensional model on a plane horizontally parallel to the environment floor.

In the present invention, the position/orientation information may be any information as long as it represents the position/orientation. An example is a set of position/orientation parameters with a total of 6 degrees of freedom given by a combination of a 3-degree-of-freedom parameters (X, Y, Z) indicating a position on the world coordinate system in the environment and a 3-degree-of-freedom parameters (Roll, Pitch, Yaw) indicating an orientation. Alternatively, the position/orientation information may be a set of position/orientation parameters with a total of 3 degrees of freedom given by a combination of a 2-degree-of-freedom position parameters indicating a position (positions X, Y in a plane horizontally parallel to the floor of the environment) on the world coordinate system in the environment and a 1-degree-of-freedom orientation parameter (an azimuth angle in a plane horizontally parallel to the floor of the environment).

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An information processing apparatus configured to determine a position of a mobile object, comprising:
   at least one memory storing instructions; and at least one processor that, upon execution of the stored instructions, is configured to operate as:

an acquisition unit configured to acquire a first processing result including information for identifying the position of the mobile object and a second processing result including information for identifying the position of the mobile object, the first processing result being obtained by executing a first processing method on an image obtained by measuring at least surroundings of the mobile object by using a light receiving sensor installed on the mobile object, the second processing result being obtained by executing a second processing method different from the first processing method on an observation result obtained by observing the mobile object by using a light receiving sensor installed at a location at which it is possible to observe the mobile object; and a determination unit configured to determine the position of the mobile object based on the first processing result and the second processing result, wherein movement of the mobile object is controlled based on the determined position.

2. The information processing apparatus according to claim 1, wherein the mobile object has a marker attached to the mobile object, and the second processing method is a method of estimating the position of the mobile object based on a result of an observation of the marker using the light receiving sensor installed at the location where it is possible to observe the mobile object.

3. The information processing apparatus according to claim 1, wherein the first processing method is a method of estimating the position of the mobile object based on the image obtained by measuring at least surroundings of the mobile object by using the light receiving sensor installed on the mobile object and based on map information including an image feature relating to a route of the mobile object.

4. The information processing apparatus according to claim 3, wherein the first processing method is a method of estimating the position of the mobile object based on a depth image obtained by measuring a distance around the mobile object using the light receiving sensor installed on the mobile object and based on the map information including a three-dimensional feature relating to the route of the mobile object.

5. The information processing apparatus according to claim 1, wherein the determination unit is further configured to determine weighting coefficients indicating a ratio at which the first processing result and the second processing result are reflected when determining the position of the mobile object, and any of the weighting coefficients is not set to zero.

6. The information processing apparatus according to claim 5, wherein the weighting coefficient for the second processing result is determined based on the distance between the mobile object and the light receiving sensor installed at the location where it is possible to observe the mobile object.

7. The information processing apparatus according to claim 6, wherein the weighting coefficient for the second processing result is determined based on a position of the mobile object in an image observed by the light receiving sensor installed at the location where it is possible to observe the mobile object.

8. The information processing apparatus according to claim 1, wherein the acquisition unit is further configured to acquire a second processing result obtained by integrating a plurality of processing results obtained by performing the second processing method on a respective plurality of observation results obtained using a plurality of light receiving sensors installed at locations where it is possible to observe the mobile object.

9. The information processing apparatus according to claim 1, wherein the acquisition unit is further configured to acquire a plurality of second processing results obtained by performing the second processing method on respective observation results acquired using a plurality of light receiving sensors installed at locations where it is possible to observe the mobile object, and the determination unit is further configured to determine the position of the mobile object based on the first processing result and the plurality of second processing results.

10. The information processing apparatus according to claim 1, wherein the acquisition unit is further configured to acquire, from the observation result on which the second processing method is executed, the number of feature points located in a space observable by the light receiving sensor installed on the mobile object, and configured to, in a case where the number of feature points is not within a predetermined range, inhibits acquisition of either a measurement result which the first processing method is executed on or the first processing result.

11. The information processing apparatus according to claim 1, wherein execution of the stored instructions further configures the at least one processor to operate as a holding unit configured to hold map information including an image feature relating to a route of the mobile object, and the determination unit is further configured to determine position coordinates of the mobile object in the map information.

12. The information processing apparatus according to claim 11, wherein the determination unit is further configured to determine a starting position of the route of the mobile object in the map information based on the observation result on which the second processing method is executed.

13. The information processing apparatus according to claim 11, wherein the holding unit further is configured to, in a case where an object is detected on the route in the map information from the observation result on which the second processing method is executed, hold map information modified such that the route is changed so as to avoid the object.

14. The information processing apparatus according to claim 11, wherein execution of the stored instructions further configures the at least one processor to operate as a determination unit configured to make a prediction, from an observation result on which the second processing method is executed, as to a moving range in which a person moves, and the holding unit is further configured to, in a case where the determination unit determines that the person is present on the route in the map information, hold the map information modified such that the route is changed so as to avoid the moving range.

15. The information processing apparatus according to claim 11, wherein the holding unit is further configured to, in a case where other one mobile object is detected on the route in the map information from the result on which the second processing method is executed, hold the map information modified such that the route of the mobile object is changed, based on map information relating to a route of the other one mobile object, so as to avoid the route of the other one mobile object.

16. The information processing apparatus according to claim 1, wherein execution of the stored instructions further configures the at least one processor to operate as a notification unit configured to, in a case where a difference between the first processing result and the second processing result is greater than a predetermined value, notify a user of an abnormality of a system.

17. The information processing apparatus according to claim 16, wherein
the notification unit is further configured to, in a case where a load loaded on the mobile object is detected on a route in map information from the observation result on which the second processing method is executed, notify the user that there is an abnormality on the route.

18. A non-transitory computer-readable medium storing a program which, when executed by a computer comprising a processor and a memory, causes the computer to perform an information processing method of determining a position of a mobile object, comprising:
acquiring a first processing result capable of identifying the position of the mobile object and a second processing result capable of identifying the position of the mobile object, the first processing result being obtained by executing a first processing method on an image obtained by measuring at least surroundings of the mobile object by using a light receiving sensor installed on the mobile object, the second processing result being obtained by executing a second processing method different from the first processing method on an observation result obtained by observing the mobile object by using a light receiving sensor installed at a location at which it is possible to observe the mobile object; and
determining the position of the mobile object based on the first processing result and the second processing result, wherein
movement of the mobile object is controlled based on the determined position.

19. An information processing method of determining a position of a mobile object, comprising:
acquiring a first processing result capable of identifying the position of the mobile object and a second processing result capable of identifying the position of the mobile object, the first processing result being obtained by executing a first processing method on an image obtained by measuring at least surroundings of the mobile object by using a light receiving sensor installed on the mobile object, the second processing result being obtained by executing a second processing method different from the first processing method on an observation result obtained by observing the mobile object by using a light receiving sensor installed at a location at which it is possible to observe the mobile object; and
determining the position of the mobile object based on the first processing result and the second processing result, wherein
movement of the mobile object is controlled based on the determined position.

* * * * *